(12) United States Patent (10) Patent No.: US 8,046,520 B2
Baba et al. (45) Date of Patent: Oct. 25, 2011

(54) COMPOUND COMPUTER SYSTEM AND METHOD FOR SHARING PCI DEVICES THEREOF

(75) Inventors: Takashige Baba, Inagi (JP); Keitaro Uehara, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 12/635,755

(22) Filed: Dec. 11, 2009

(65) Prior Publication Data

US 2010/0153615 A1 Jun. 17, 2010

(30) Foreign Application Priority Data

Dec. 17, 2008 (JP) ................................. 2008-321136

(51) Int. Cl.
*G06F 13/00* (2006.01)
(52) U.S. Cl. ........................... 710/316; 710/104; 714/23
(58) Field of Classification Search .................. 710/316, 710/104, 15, 17; 714/48–57, 23
See application file for complete search history.

(56) References Cited

U.S. PATENT DOCUMENTS

| 7,058,738 | B2 | 6/2006 | Stufflebeam, Jr. | |
| 7,707,465 | B2 * | 4/2010 | Boyd et al. | ........................ 714/57 |
| 2002/0008961 | A1 | 1/2002 | Amaike et al. | |

FOREIGN PATENT DOCUMENTS

JP 2002-32153 A 1/2002

OTHER PUBLICATIONS

Advanced Switching Technology Tech Brief, issued in 2005, ASI-SIG.

* cited by examiner

*Primary Examiner* — Clifford Knoll
(74) *Attorney, Agent, or Firm* — Mattingly & Malur, PC

(57) ABSTRACT

A resource management module of a management server for controlling a multi-root I/O manager connected to a PCI switch for connecting a plurality of I/O devices and a plurality of computers with each other includes: failure handling content information indicating, for each computer sharing a multi-root I/O device, a content of a failure handling at an occurrence of a failure in the multi-root I/O device; and failure handling availability status information indicating whether a hardware reset of the multi-root I/O device is possible and updates, upon reception of a notification of the occurrence of the failure in the multi-root I/O device, the failure handling availability status information, and instructs, based on the failure handling availability status information, the multi-root I/O manager to restrain or cancel the hardware reset of the multi-root I/O device.

15 Claims, 24 Drawing Sheets

| K201 | K202 | K203 | K204 | K205 | K206 | K207 |
|---|---|---|---|---|---|---|
| I/O DEVICE IDENTIFIER | PCI Function IDENTIFIER | ASSIGNED COMPUTER | FAILURE HANDLING METHOD | I/O DEVICE SWITCHING UPON FAILURE | OS TYPE | FAILURE HANDLING AVAILABILITY STATUS |
| 1 | 1 | 1 | REBOOT OS | NO | OS A | IMPOSSIBLE |
| 1 | 2 | 2 | RETRY | NO | OS B | IMPOSSIBLE |
| 1 | 3 | 3 | CLOSE | YES | OS A | IMPOSSIBLE |
| ⋮ | ⋮ | ⋮ | ⋮ | ⋮ | ⋮ | ⋮ |
| 2 | 1 | 1 | CLOSE I/O | YES | OS A | IMPOSSIBLE |
| 2 | 2 | 2 | RETRY | NO | OS B | IMPOSSIBLE |
| 2 | 3 | 3 | STOP OS | YES | OS A | IMPOSSIBLE |
|  |  |  |  |  |  |  |

FIG.3

| I/O DEVICE NUMBER (K901) | TYPE (K902) | FAILURE HANDLING METHOD (K903) | I/O DEVICE SWITCHING UPON FAILURE (K904) | INFORMATION ON EXTERNAL DEVICE (K905) |
| --- | --- | --- | --- | --- |
| 1 | GbE NIC | RETRY | NO | VLAN1 |
| 2 | GbE NIC | RETRY | NO | VLAN2 |
| 3 | GbE NIC | CLOSE | YES | VLAN3 |
| 4 | FC-HBA(1G) | REBOOT | NO | STORAGE SYSTEM 1 |
| 5 | FC-HBA(1G) | REBOOT | NO | STORAGE SYSTEM 1 |
| ⋮ | ⋮ | ⋮ | ⋮ | ⋮ |

FIG.10

| I/O DEVICE IDENTIFIER K1301 | PCI Function IDENTIFIER K1302 | FREE BANDWIDTH K1303 |
|---|---|---|
| 2 | 1 | 1Gbps |
| 2 | 2 | 1Gbps |
| 10 | 2 | 2Gbps |
| ... | ... | ... |

| | K201 | K202 | K203 | K204 | K205 | K206 | K207 | K1601 FT16 |
|---|---|---|---|---|---|---|---|---|
| | I/O DEVICE IDENTIFIER | PCI Function IDENTIFIER | ASSIGNED COMPUTER | FAILURE HANDLING METHOD | I/O DEVICE SWITCHING UPON FAILURE | OS TYPE | FAILURE HANDLING AVAILABILITY STATUS | FAILURE HANDLING PRIORITY |
| | 1 | 1 | 1 | REBOOT OS | NO | Redhat EL 5 | IMPOSSIBLE | 1 |
| | 1 | 2 | 2 | RETRY | NO | Windows Server2008 | IMPOSSIBLE | 5 |
| | 1 | 3 | 3 | CLOSE | YES | Windows Server2008 | IMPOSSIBLE | 3 |
| | ⋮ | ⋮ | ⋮ | ⋮ | ⋮ | ⋮ | ⋮ | ⋮ |
| | 2 | 1 | 1 | CLOSE I/O | YES | Redhat EL 5 | IMPOSSIBLE | 1 |
| | 2 | 2 | 2 | RETRY | NO | Windows Server2008 | IMPOSSIBLE | 5 |
| | 2 | 3 | 3 | STOP OS | YES | Windows Server2008 | IMPOSSIBLE | 3 |
| | ⋮ | ⋮ | ⋮ | ⋮ | ⋮ | ⋮ | ⋮ | ⋮ |

FIG.17

| CONDITIONS | | | FAILURE HANDLING METHOD TO BE SELECTED | |
|---|---|---|---|---|
| OS | BIOS | I/O DEVICE | POLICY LEVEL: HIGH | POLICY LEVEL: LOW |
| I/O RETRY: SUPPORTED<br>I/O CLOSE: NOT SUPPORTED | I/O RETRY: SUPPORTED<br>I/O CLOSE: SUPPORTED | I/O RETRY: SUPPORTED<br>I/O CLOSE: SUPPORTED | I/O RETRY | OS REBOOT |
| I/O RETRY: NOT SUPPORTED<br>I/O CLOSE: SUPPORTED | I/O RETRY: SUPPORTED<br>I/O CLOSE: SUPPORTED | I/O RETRY: SUPPORTED<br>I/O CLOSE: SUPPORTED | I/O CLOSE | OS REBOOT |
| I/O RETRY: SUPPORTED<br>I/O CLOSE: SUPPORTED | I/O RETRY: SUPPORTED<br>I/O CLOSE: SUPPORTED | I/O RETRY: NOT SUPPORTED<br>I/O CLOSE: SUPPORTED | I/O CLOSE | OS REBOOT |
| I/O RETRY: SUPPORTED<br>I/O CLOSE: SUPPORTED | I/O RETRY: SUPPORTED<br>I/O CLOSE: SUPPORTED | I/O RETRY: NOT SUPPORTED<br>I/O CLOSE: NOT SUPPORTED | OS REBOOT | OS REBOOT |
| K2101 | K2102 | K2103 | K2104 | K2105 |

FIG.22

| I/O DEVICE NUMBER | TYPE | I/O DEVICE SWITCHING UPON FAILURE | INFORMATION ON EXTERNAL DEVICE |
|---|---|---|---|
| 1 | GbE NIC | NO | VLAN1 |
| 2 | GbE NIC | NO | VLAN2 |
| 3 | GbE NIC | YES | VLAN3 |
| 4 | FC-HBA(1G) | NO | STORAGE SYSTEM 1 |
| 5 | FC-HBA(1G) | NO | STORAGE SYSTEM 1 |
| ... | ... | ... | ... |

POLICY LEVEL: HIGH

FIG.23

COMPOUND COMPUTER SYSTEM AND METHOD FOR SHARING PCI DEVICES THEREOF

CLAIM OF PRIORITY

The present application claims priority from Japanese patent application JP 2008-321136 filed on Dec. 17, 2008, the content of which is hereby incorporated by reference into this application.

BACKGROUND OF THE INVENTION

This invention relates to a device control technology for a compound computer system in which a plurality of computers and a plurality of I/O devices are connected with each other via peripheral component interconnect (PCI) switches, and more particularly, to control for handing a failure which has occurred in an I/O device shared by a plurality of computers.

IT systems used for processing for task-related information in companies are configured by various servers including WEB servers for displaying information to users information on respective tasks, application (AP) servers for integrating and processing information, database (DB) servers for accumulating and storing information, and the like. Those servers use computers, each including a CPU, a memory, and I/O devices. The IT system is configured by a large number of servers as described above, and hence, in order to simplify management of the servers, blade servers in which a plurality of computers are installed in one apparatus have been employed (refer to JP 2002-32153 A).

The processing performance of a CPU used for a computer has been increased in recent years by means of a multi-core configuration in which the CPU includes a plurality of processor cores, and a virtual server technology has been employed for operating a plurality of virtual servers on one computer for efficient use of the CPU. Further, computers use I/O devices such as a network interface card (NIC), and a fiber channel-host bus adaptor (FC-HBA) for network communication with other computers and connection to storage systems.

While a plurality of serves operate on one computer, the number of I/O devices which are connectable to the one computer has not increased due to physical constraint, and the number of I/O devices per computer is relatively insufficient.

Technologies for making up for the insufficient number of I/O devices include a multi-root I/O switch technology which enables a plurality of computers and a plurality of I/O devices to connect with each other, and a multi-root IO virtualization (IOV) technology for enabling a plurality of computers to share one I/O device. The multi-root I/O switch technology enables to change, in a scalable manner, the number of I/O devices which are connectable to one computer (see "Advanced Switching Technology Tech Brief", issued in 2005, written by ASI-SIG, for example; hereinafter, referred to as Non-patent Document 1). The multi-root I/O virtualization technology enables to increase, by sharing one I/O device by a plurality of computers, the number of I/O devices in a virtual manner. By using those technologies, it is possible to solve the problem of the insufficient number of I/O devices when virtual servers are used (see U.S. Pat. No. 7,058,738).

The blade server which contains a plurality of computers in an enclosure is described in JP 2002-32153 A titled "CARTRIDGE TYPE SERVER UNIT AND A CABINET TO ACCOMMODATE A PLURALITY OF SAID SERVER UNITS". The multi-root I/O switch technology of this type is described in Non-patent Document 1.

SUMMARY OF THE INVENTION

In a conventional computer, an I/O device and the computer are connected to each other on a one-to-one basis in a fixed manner, and one I/O device is not shared by a plurality of computers. On the other hand, in a compound computer system employing the multi-root I/O virtualization technology described above, one I/O device may be shared and used by a plurality of computers. In a compound computer system employing the multi-root I/O virtualization technology, the inventor(s) of this invention have found out that there arise the following problems when handling a failure occurring in an I/O device shared by a plurality of computers.

In order to handle a failure occurring in the I/O device, there may be employed various failure handling methods including an OS stop process of stopping an OS by shutting down the OS or powering off a computer, an OS reboot process of restarting an OS after shutting down the OS or powering off a computer, an I/O close process for disabling an I/O device in which a failure has occurred, and an I/O retry process for trying recovery of a failed I/O device. Which one of these failure handling methods is employed for an I/O device is determined based mainly on the following two points.

The first point is whether respective components of the computer support each of the failure handling methods. The respective components of the computer in this case include an I/O device, a chipset, firmware such as a BIOS, and an OS. For example, in order to carry out the I/O retry process, the I/O device, the chipset, the firmware, and the OS each need to support the I/O retry process to be carried out.

The second point depends on a failure handling policy of a user of the computer. For example, in a computer in which availability is emphasized for keeping a user task continuously running as much as possible, the I/O retry process is used with expectation that communications may be restarted, while the OS stop process or the OS reboot process is employed in a computer in which the availability is less important.

Though the failure handling of an I/O device includes a plurality of methods, when an I/O device is shared by a plurality of computers as described above, the computers may employ different failure handling methods for the I/O device. This is because, in view of the first point, each computer supports a failure handling method different from each other, or, in view of the second point, each computer has a failure handling policy of a user different from each other.

As described above, when a plurality of computers sharing an I/O device support different failure handling methods for the I/O device, there arises a problem that the failure handlings for the I/O device conflict one another, resulting in an unsuccessful failure handling.

For example, the problem is as follows. When two computers are sharing one I/O device, and a first one of the computers employs the I/O retry process as the failure handling method for an I/O device while a second one of the computers employs the OS reboot process, if the OS reboot by the second computer causes a hardware reset of the I/O device during the I/O retry process by the first computer, the I/O retry process by the first computer is interrupted, which results in unsuccessful execution of the failure handling.

This invention has been made to solve the above-mentioned problem, and therefore, it is an object of this invention to arbitrate, when one I/O device is shared by a plurality of computers, failure handlings carried out by the respective computers at an occurrence of a failure in the I/O device, among the computers, to thereby carry out the failure handlings without affecting other computers sharing the I/O device.

A representative aspect of this invention is as follows.

A compound computer system, comprising: a plurality of computers comprising: a processor for carrying out arithmetic processing; a memory for storing information; and a chipset connected to the processor and having a PCI interface; a plurality of I/O devices comprising a multi-root I/O device sharable among the plurality of computers; at least one PCI switch for mutually connecting the plurality of computers and the plurality of I/O devices with each other; a multi-root I/O manager for controlling the at least one PCI switch to manage logical connections between the plurality of computers and the plurality of I/O devices, the multi-root I/O manager comprising: a monitoring module for monitoring the at least one PCI switch, and making, at an occurrence of a failure in the multi-root I/O device, a notification of the failure of the multi-root I/O device; and an I/O-device-hard-reset restraining module for restraining, at the occurrence of the failure in the multi-root I/O device, a hardware reset of the multi-root I/O device; and a resource management module for managing assignment of the plurality of I/O devices to the plurality of computers, the resource management module comprising: I/O device management information containing, as management information on the multi-root I/O device, at least failure handling content information indicating, for each of the plurality of computers sharing the multi-root I/O device, a content of a failure handling at the occurrence of the failure in the multi-root I/O device, and failure handling availability status information indicating, for the each of the plurality of computers sharing the multi-root I/O device, whether the hardware reset of the multi-root I/O device is possible; and a failure handling arbitration module for receiving the notification of the occurrence of the failure in the multi-root I/O device from the multi-root I/O manager, obtaining, in response to the notification of the occurrence of the failure, progress information on the failure handling from the each of the plurality of computers sharing the multi-root I/O device, updating the failure handling availability status information, and instructing, based on the failure handling availability status information, the multi-root I/O manager to one of restrain and cancel the hardware reset of the multi-root I/O device, wherein: the each of the plurality of computers carries out, at the occurrence of the failure in the multi-root I/O device, the failure handling specified by the failure handling content information, and requests, when the failure handling is the hardware reset of the multi-root I/O device, the multi-root I/O manager to carry out the hardware reset of the multi-root I/O device; and the I/O-device-hard-reset restraining module restrains, upon reception of an instruction to restrain the hardware reset of the multi-root I/O device from the failure handling arbitration module in response to a request for the hardware reset of the multi-root I/O device in which the failure has occurred, the request being received from the each of the plurality of computers, the hardware reset of the multi-root I/O device. Therefore, according to this invention, even when one I/O device is shared by a plurality of computers, the resource management module arbitrates failure handlings (hardware resets of the multi-root I/O device) to be carried out by each of the computers among the computers when a failure has occurred in the I/O device, the failure handling may be carried out without affecting the other computers sharing the I/O device, and, consequently, the I/O device may be shared while the failure handling functions are still maintained among the computers which are different in failure handling, type of the OS, or type of the BIOS.

Further, when forming a computer (or switching, when an I/O device fails, to another I/O device), the content information of the failure recovery process (failure handling) is contained in the profile information on a computer set in advance, and the resource management module selects a computer and an I/O device, based on the content information of the failure recovery process, considering the content of the failure handling. Accordingly, the configuration for sharing the multi-root I/O device by a plurality of computers may be easily set with consideration given to the failure recovery process.

BRIEF DESCRIPTION OF THE DRAWINGS

FIG. 3 illustrates an example of the I/O device management information 128 on the compound computer system according to the first embodiment.

FIG. 10 illustrates an example of the server profile 127 of the compound computer system according to the first embodiment.

FIG. 14 illustrates an example of the I/O device management information 128 as information on I/O device switching candidates of the compound computer system according to the first embodiment.

FIG. 17 illustrates an example of the I/O device management information 128 held by the management server 105 of the compound computer system according to the second embodiment.

FIG. 22 illustrates an example of failure handling policy information on I/O devices of the compound computer system according to the fifth embodiment.

FIG. 23 illustrates an example of the server profile 127 of the compound computer system according to the fifth embodiment.

DETAILED DESCRIPTION OF THE PREFERRED EMBODIMENTS

In the following, a description is given of embodiments of this invention referring to the accompanying drawings. Throughout the drawings for illustrating the embodiments, like components are principally denoted by like numerals, and a duplicate description thereof is omitted.

First Embodiment

Figure 1:
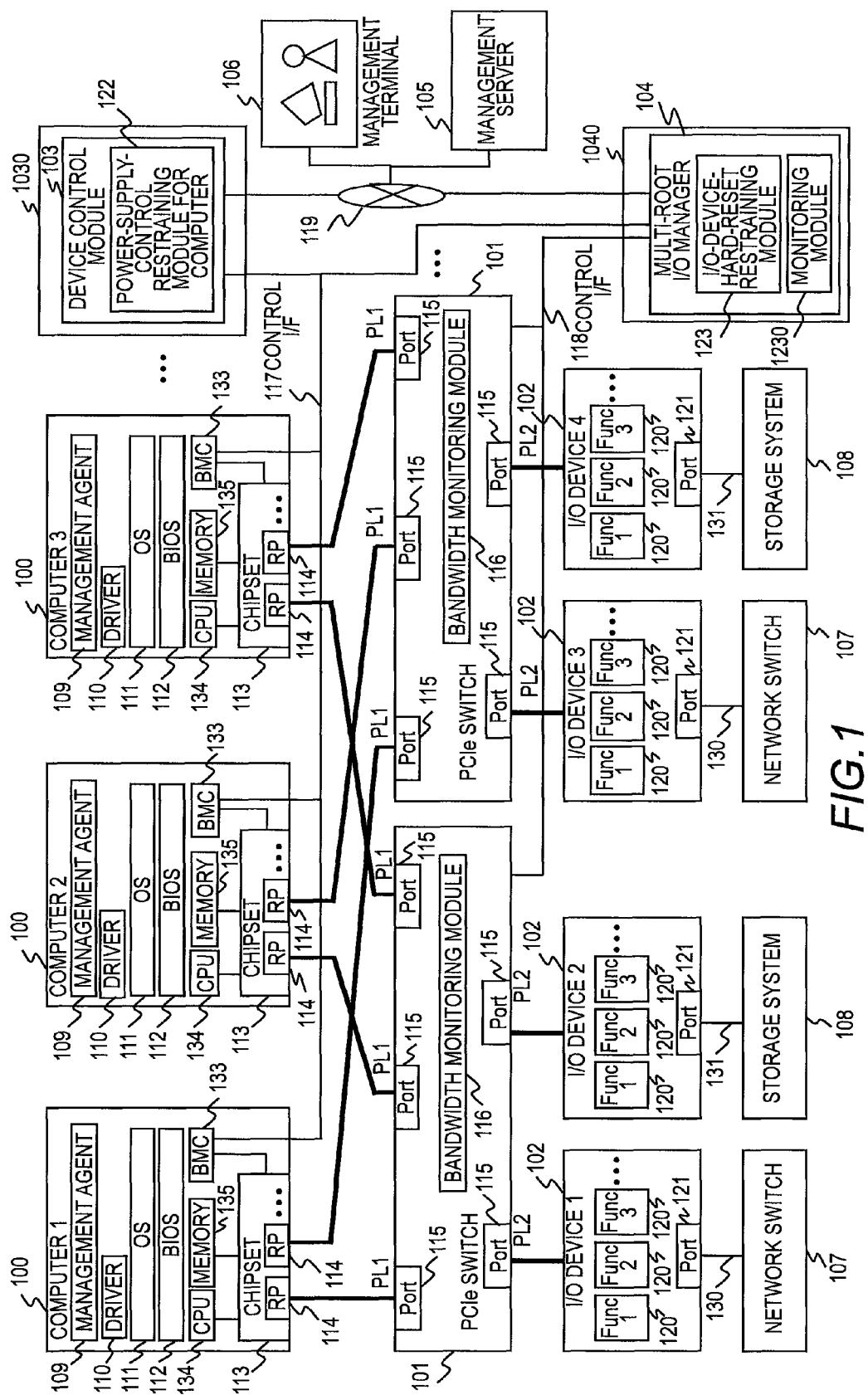
FIG. 1 is a block diagram of the compound computer system according to the first embodiment of this invention.

First, a description is given of a configuration of a compound computer system according to a first embodiment of this invention. FIG. 1 is a block diagram of the compound computer system according to the first embodiment of this invention.

As illustrated in FIG. 1, the compound computer system according to this embodiment includes at least one multi-root PCI Express switch 101 which is capable of mutually connecting at least one computer 100 and a plurality of multi-root I/O devices 102 with each other, at least one multi-root I/O device 102 for assigning Functions 120 set in advance to different computers 100 for sharing, a device control computer 1030 for executing a device control module 103 in order to provide power supply control and the like of the computers 100, a switch management computer 1040 for executing a multi-root I/O manager 104 for providing control such as initialization of the multi-root PCI Express switches 101 and the multi-root I/O devices 102, setting of connections (or assignments) between the multi-root PCI Express switches 101 and the computers 100 and between the multi-root PCI Express switches 101 and the multi-root I/O devices 102, a control interface (I/F) 117 for connecting the multi-root PCI express switches 101 and the multi-root I/O managers 104 with each other, and a control I/F 118 for connecting the plurality of computers 100 to the device control computer 1030 and the switch management computer 1040. It should be noted that, these control I/Fs 117 and 118 employ interfaces such as a local area network (LAN) for control, an inter-integrate circuit (12C), and the like.

Further, the compound computer system includes, as management components, a management server 105 on which resource management software 132 (resource management module) runs, and the management terminal 106. The resource management software 132 receives requests from the management terminal 106 operated by an administrator, and manages assignments of the multi-root I/O device 102 to the computers 100. The management terminal 106 is a terminal computer configured by a PC or the like for managing the compound computer system. The management terminal 106, the management server 105, the device control computer 1030, and the switch management computer 1040 are connected with one another via the management network 119 such as a LAN for management.

The multi-root I/O devices 102 in the drawing includes, for example, I/O devices 1 and 3 which are network interface cards (NICs) provided with network interfaces, and I/O devices 2 and 4 which are disk interfaces configured by host bus adaptors (HBAs) or redundant array of independent disks (RAID) cards.

The network switches 107, such as gigabit Ethernet switches, and the storage devices 108, such as RAID devices and fiber channel (FC) switches, are external components relating to the compound computer system, and are connected to the compound computer system, via physical ports 121 of the multi-root I/O devices 102, the network interfaces 130 such as gigabit Ethernet, and the storage network interfaces 131 such as FC.

The computer 100 is provided with hardware configuration elements including a CPU (processor) 134, a memory 135, a chipset 113 for providing a connection to the multi-root PCI Express switch 101 from the CPU 134, the memory 135, and the like, and a baseboard management controller (BMC) 133 connected to the chipset 113 for providing control related to operations such as initialization of the computer 100, the power supply to the computer 100, and the reset of the computer 100. The BMC 133 is provided with a processor, a memory, and a communication interface for communication with the device control computer 1030 and the multi-route I/O manager 104, and carries out monitoring of hardware of the computer 100, such as a circuit board, the chipset 113, the CPU 134, and the like, and power supply control (start, stop, and restart) of the computer 100. The hardware monitoring carried out by the BMC 133 includes monitoring of the temperature of the CPU 134, the rotational speed of a cooling fan, a drive voltage of the CPU 134, as well as monitoring of temperatures and voltages at other predetermined locations. It should be noted that this embodiment is described as an example in which the device control module 103 provides instructions to the BMC 133 for starting and stopping the computer 100 under a normal condition, and the chipset 113 provides instructions for starting and stopping the computer 100 (OS 111) during a failure recovery process of the multi-root I/O device 102.

The computer 100 is provided with software configuration elements including a basic input/output system (BIOS) 112, the operating system (OS) 111, a device driver 110 of the multi-root I/O (input/output) device 102, and a management agent 109 as software for communicating with resource management software 132 operating on the management server 105 so as to manage the computer 100. In the example illustrated in FIG. 1, each of the respective configuration elements is illustrated as a single component. Alternatively, a plurality of components may be included.

The multi-root PCI Express switch 101 includes physical ports 115 compliant with a plurality of PCI Express standards, and is provided with a bandwidth monitoring module 116 for obtaining bandwidth information on communication carried out by each of the physical ports 115. The computer 100 and the multi-root PCI Express switch 101 are connected with each other by connecting between a root port 114 of the chipset 113, which is a physical port compliant with the PCI Express, and the physical port 115 of the multi-root PCI express switch 101 via a PCI Express link PL1. Further, the multi-root PCI Express switch 101 and the multi-root I/O device 102 are connected with each other via a PCI Express link PL2. The most upstream port on a PCI bus, namely a port closest to the CPU 134 and the memory 135 is distinguished and referred to as root port (RP) 114.

Figure 2:
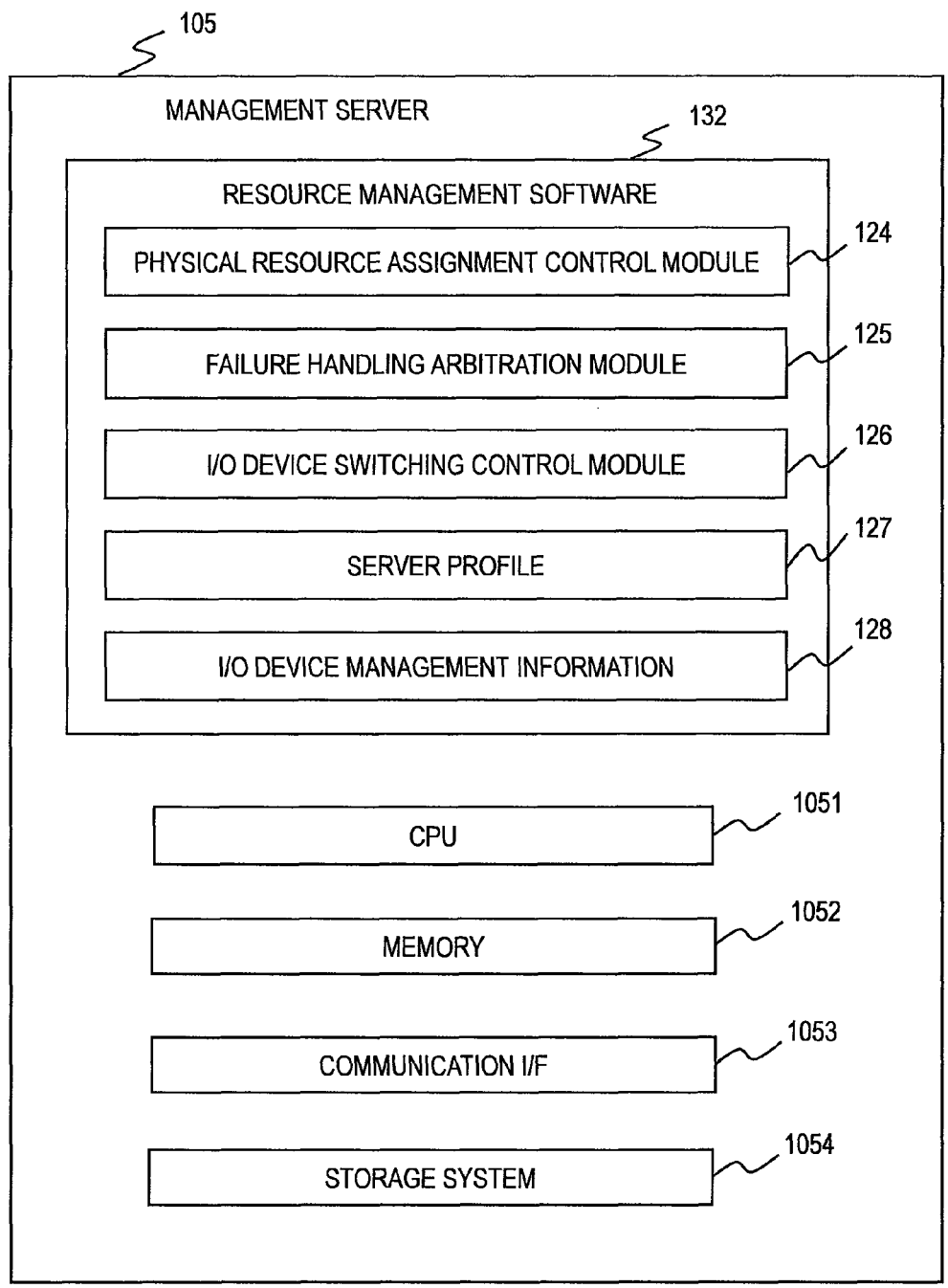
FIG. 2 is a block diagram of the management server 105 executing the resource management software 132.

Next, a description is given of components for managing the compound computer system. FIG. 2 is a block diagram of the management server 105 executing the resource management software 132. The management server 105 is configured by a CPU 1051 for carrying out arithmetic operations, a memory 1052 for storing data and programs for use by the CPU 1051, a communication interface 1053 for communicating with the management network 119, and a storage system 1054 for holding data and programs.

The memory 1052 has an OS (not shown) and the resource management software 132 loaded thereinto, which are executed by the CPU 1051. It should be noted that the OS and the resource management software 132 are held in the storage system 1054 serving as a machine readable medium, and are loaded into the memory 1052 by the CPU 1051.

The resource management software 132 includes a physical resource assignment control module 124, a failure handling arbitration module 125, and an I/O device switching control module 126, and is provided with, as management information, a server profile 127 and I/O device management information 128.

The physical resource assignment control module 124 determines, based on the server profile 127, a type of OS to be executed by a computer 100 and, based on a content of a failure handling performed at an occurrence of a failure, a multi-root I/O device 102 to be assigned to the computer 100, and instructs the multi-root I/O manager 104 to assign the multi-root I/O device 102 to the computer 100.

The failure handling arbitration module 125 receives a failure occurrence notification from the multi-root I/O manager 104, carries out the failure handling (failure recovery process), provides predetermined instructions to the device control computer 1030 and the switch management computer 1040 as described later, to thereby arbitrate among processes carried out at an occurrence of a failure in the multi-root I/O device 102 shared by a plurality of computers 100.

When a failure has occurred in the multi-root I/O device 102, the I/O device switching control module 126 provides instructions based on the I/O device management information 128 to the multi-root I/O manager 104 to replace the multi-root I/O device 102 to be assigned to the computer 100.

The device control computer 1030, similarly to the management server 105, is configured by a computer provided with a CPU, a memory, and a storage system, which are not illustrated, in which the CPU loads, into the memory, the device control module 103 for controlling the start and stop of the computer 100, and executes the device control module 103. The device control module 103 includes a power supply control restraining module 122 for restraining, when failure handlings conflict at an occurrence of a failure in the multi-root I/O device 102, stop (OS stop) and restart (OS reboot) of the computer 100.

The switch management computer 1040, similarly to the management server 105, is configured by a computer provided with a CPU, a memory, and a storage system, which are not shown, in which the CPU controls the PCI Express switches 101, and loads into the memory, the multi-root I/O manager 104 for managing assignment of the multi-root I/O device 102 to the computers 100 and executes the multi-root I/O manager 104. The multi-root I/O manager 104 includes a monitoring module 1230 for monitoring the PCI Express switches 101 and the multi-root I/O devices 102, and, when a failure has occurred in the multi-root I/O device 102 or the PCI Express switch 101, notifying the management server 105 of the failure. The multi-root I/O manager 104 further includes an I/O-device-hardware-reset restraining module 123 for restraining (inhibiting) restart (hardware reset) of the multi-root I/O device 102 when failure handlings conflict at an occurrence of a failure in the multi-root I/O device 102.

Hereinbelow, a detailed description is given of the management information held by the compound computer system according to the first embodiment, with reference to FIGS. 3, 10, and 14.

FIG. 3 illustrates an example of the I/O device management information 128 on the compound computer system according to the first embodiment. FIG. 10 illustrates an example of the server profile 127 of the compound computer system according to the first embodiment. FIG. 14 illustrates an example of the I/O device management information 128 as information on I/O device switching candidates of the compound computer system according to the first embodiment.

The server profile 127 includes information on specifications of the computer 100 to be requested from the management terminal 106 operated by the administrator of the computers 100 (or compound computer system), and contains information on specifications of the CPU 134, the memory 135, the multi-root I/O device 102, the OS 111, and the like. The server profile 127 is created by the administrator of the computers 100 on the management terminal 106 for each computer 100 to be requested, and is held by the resource management software 132. In other words, the administrator of the computers 100 (or compound computer system) makes access from the management terminal 106 to the server profile 127 in the resource management software 132 of the management server 105, and sets information on the specifications of the computers 100, multi-root I/O devices 102 to be assigned to the computer 100, and failure handlings.

FIG. 10 illustrates in a tabular form FT9, information contained in the server profile 127 of a certain single computer 100, the information relating to I/O devices. The information includes, as information on the I/O devices necessary for the computer 100, columns of I/O device number K901 for identifying an I/O device in the computer 100, I/O device type K902, failure handling method K903 for indicating a failure handling method performed at an occurrence of a failure in the I/O device, I/O device switching upon failure K904 for storing information on whether the multi-root I/O device 102 is switched at an occurrence of a failure, and information on an external device K905 for identifying an external device to which the I/O device is connected.

For example, in a record with the I/O device number K901 of "1", the type K902 of the multi-root I/O device 102 is a Gigabit Ethernet (registered trademark) network interface card (GbE NIC), the failure handling method K903 at an occurrence of a failure is "RETRY", the I/O device switching upon failure K904 is "NO", and the information on external terminal K905 is "VLAN1" to which the I/O device is connected. A detailed description is given later of the failure handling methods.

Though not illustrated in FIG. 10, the server profile 127 includes, for each of the computers 1 to 3, specification information containing the type of the CPU 134, the quantity of the memory 135, the type of the multi-root I/O device 102, and the type of the OS 111.

On the other hand, the I/O device management information 128 contains information on the assignment of the computer 100 of the compound computer system to the multi-root I/O device 102, and the like. The I/O device management information 128 is illustrated in a tabular form FT2 of FIG. 3, which includes columns for an I/O device identifier K201 which includes an identifier of a multi-root I/O device 102 in the compound computer system, an identifier K202 which includes an identifier of a PCI Function 120 in the multi-root I/O device 102, a computer identifier K203 which includes an identifier of a computer 100 to which the PCI Function 120 is assigned, a failure handling method K204 at an occurrence of a failure on the multi-root I/O device 102, I/O device switching information upon failure K205 indicating whether the multi-root I/O device 102 is to be switched at an occurrence of a failure in the multi-root I/O device 102, an OS type K206 indicating a type of an OS operating on the computer 100 to which the PCI Function 120 is assigned, and failure handling availability status information K207, as status information on a failure handling at an occurrence of a failure in the multi-root I/O device 102, indicating whether the hard reset (hardware reset) of the multi-root I/O device 102 may be carried out.

For example, one record indicates that a multi-root I/O device 102 having an I/o device identifier K201 of "1", and an identifier K202 of a PCI Function 120 of "3" is assigned to a computer 100 having an identifier K203 of "3", the failure handling method K204 is "CLOSE", the I/O device switching upon failure K205 is "YES" indicating that the multi-root I/O device 102 is to be switched, the type K206 of the OS is "OS A", and the failure handling availability status K207 is "IMPOSSIBLE" to carry out hardware reset.

Further, as in the case of this example of FIG. 3, when the I/O device switching upon failure K205 is "YES", the I/O device management information 128 contains, as information on candidate I/O devices for replacing the multi-root I/O device 102, information illustrated in FIG. 14. In other words, the information, when illustrated in a tabular form FT13 of FIG. 14, is configured by columns for an I/O device identifier K1301 storing an identifier of a multi-root I/O device 102 as a switching candidate, a PCI function identifier K1302 storing an identifier of a PCI function identifier in the multi-root I/O device 102, and a free bandwidth K1303 of the PCI Function 120.

The free bandwidth K1303 is calculated by the management server 105 according to the following equation, based on a bandwidth per unit time W1 which was used by the multi-root I/O device 102, and is obtained by the bandwidth monitoring module 116 in the PCI Express switch 101, and the maximum bandwidth WT defined as a specification of the multi-root I/O device 102. It should be noted that the bandwidth W may be represented by an average of the data transfer rate (Mbyte/sec) or an average of transaction number per unit time (BT/sec).

$$Free\ Bandwidth = WT - W1$$

The resource management software 132 obtains the bandwidth W1 of the multi-root I/O device 102 via the switch management computer 1040, for example. The free bandwidth K1303 is not limited to the above-mentioned example, and may include various kinds of information as long as the information represents the state of the free bandwidth of the multi-root I/O device 102.

As illustrated in FIG. 3, the failure handling method K204 upon a I/O device failure may vary according to the PCI function 120 of the multi-root I/O device 102. This is because the available failure handling method is different depending on the type of the OS running on the each computer 100 and the type of the BIOS (or extensible firmware interface (EFI)) 112 equipped on the each computer 100. The failure handling method K204 includes the OS stop process, the OS reboot process, an I/O close process, an I/O retry process, and the like. The OS stop process is a process of shutting down the OS 111 or stopping the OS 111 by powering off the computer 100, the OS reboot process is a process of restarting the OS 111 after shutting down the OS 111 or stopping the OS 111 by powering off the computer 100, the I/O close process is a process of inhibiting use of a failed multi-root I/O device 102, and the I/O retry process is a process for trying recovery of a failed multi-root I/O device 102 from a failure.

Next, a description is given of the failure handling methods upon an I/O device failure in the compound computer system according to the first embodiment, with reference to FIGS. 4 to 8.

Figure 4:
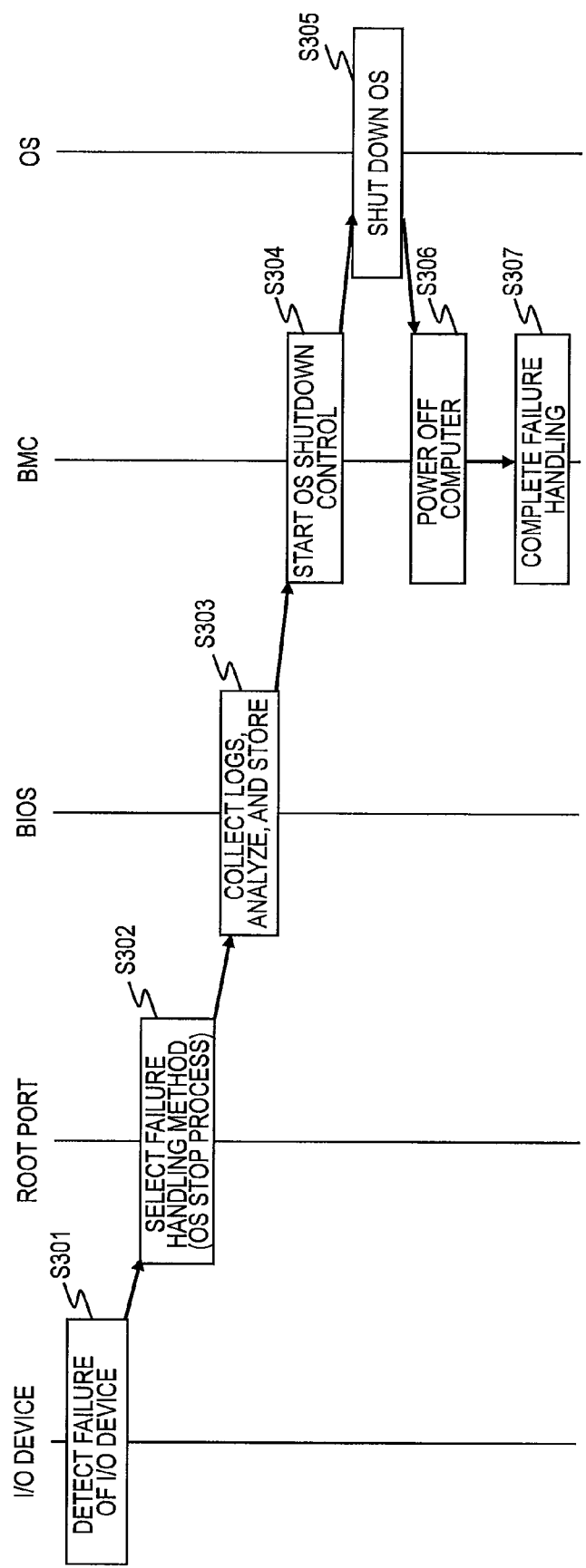
FIG. 4 is a flowchart illustrating an example of the failure handling method (OS stop process) upon an I/O device failure in the compound computer system according to the first embodiment of this invention.
Figure 5:
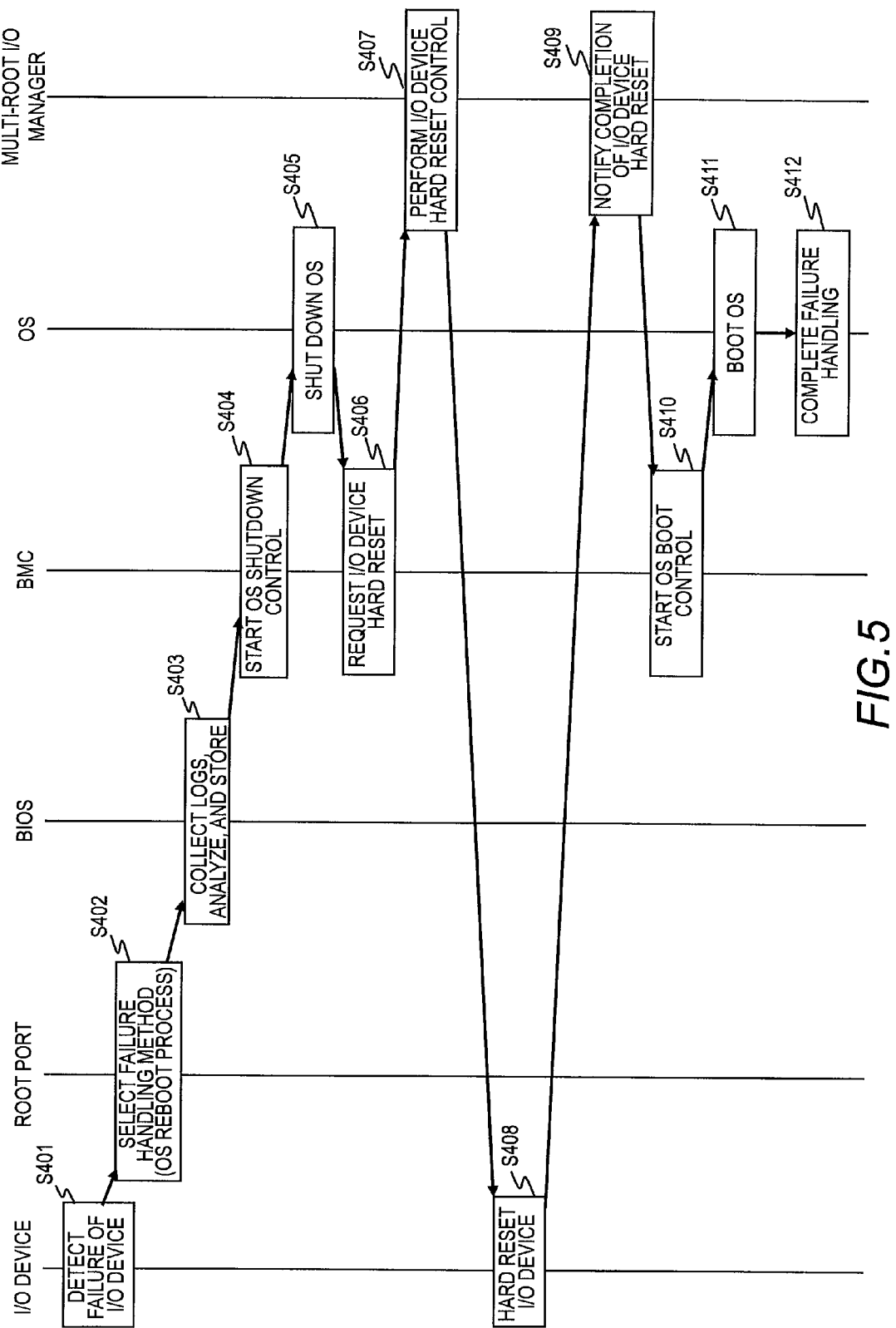
FIG. 5 is a flowchart illustrating an example of the failure handling method (OS stop process) upon an I/O device failure in the compound computer system according to the first embodiment of this invention.
Figure 6:
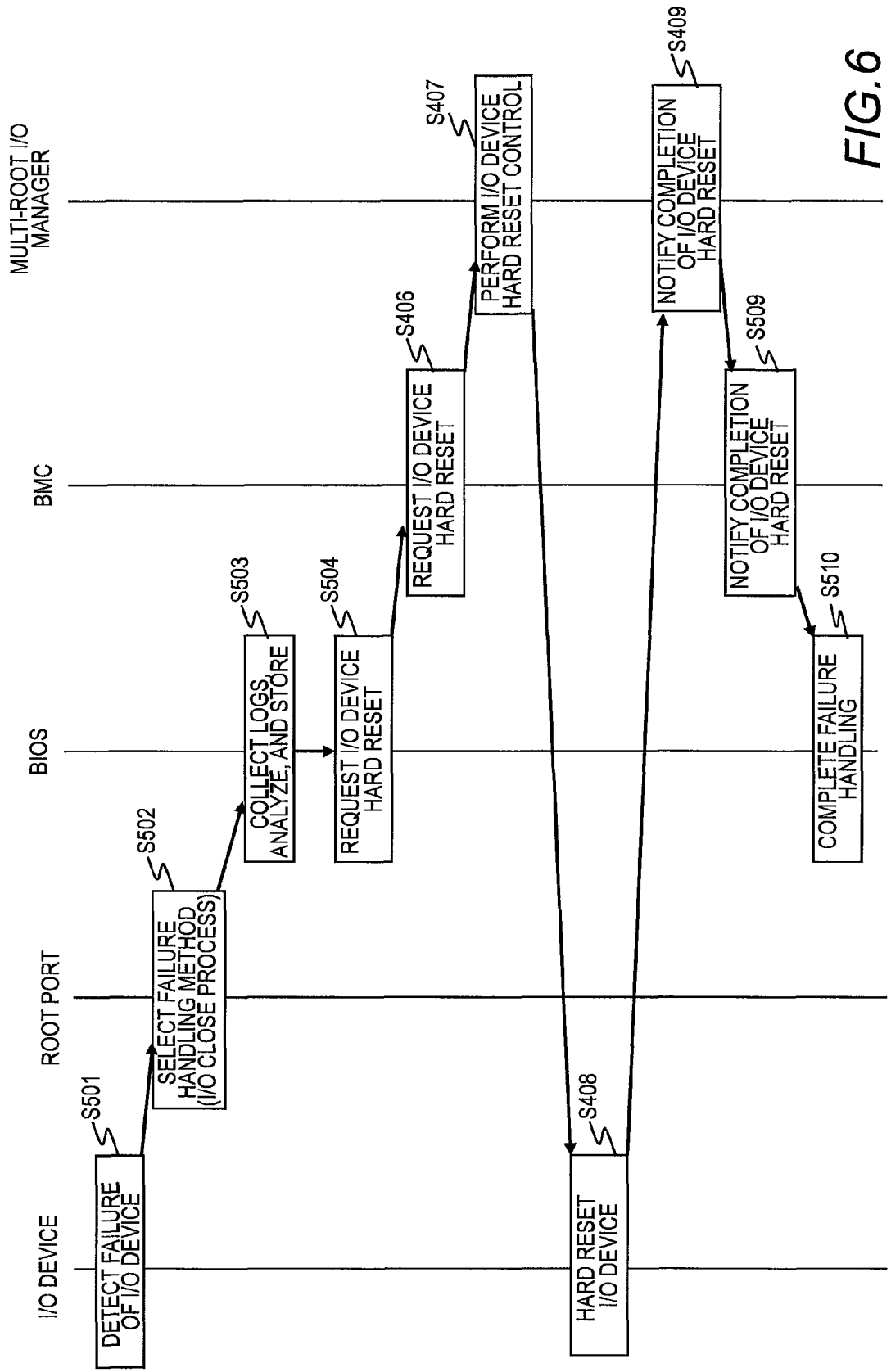
FIG. 6 is a flowchart illustrating an example of the failure handling method (OS close process) upon an I/O device failure in the compound computer system according to the first embodiment of this invention.
Figure 7:
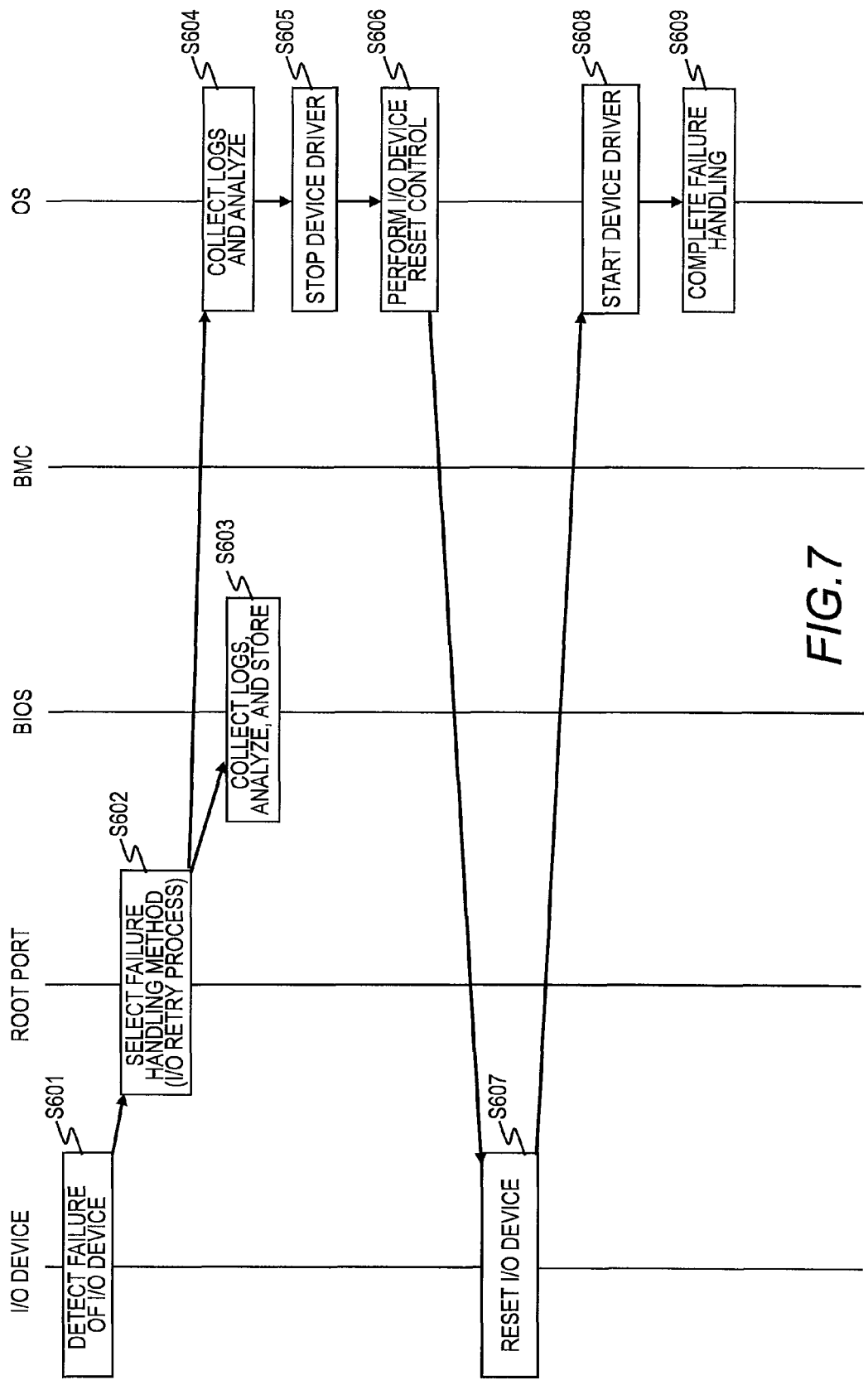
FIG. 7 is a flowchart illustrating an example of the failure handling method (OS retry process (1)) upon an I/O device failure in the compound computer system according to the first embodiment of this invention.
Figure 8:
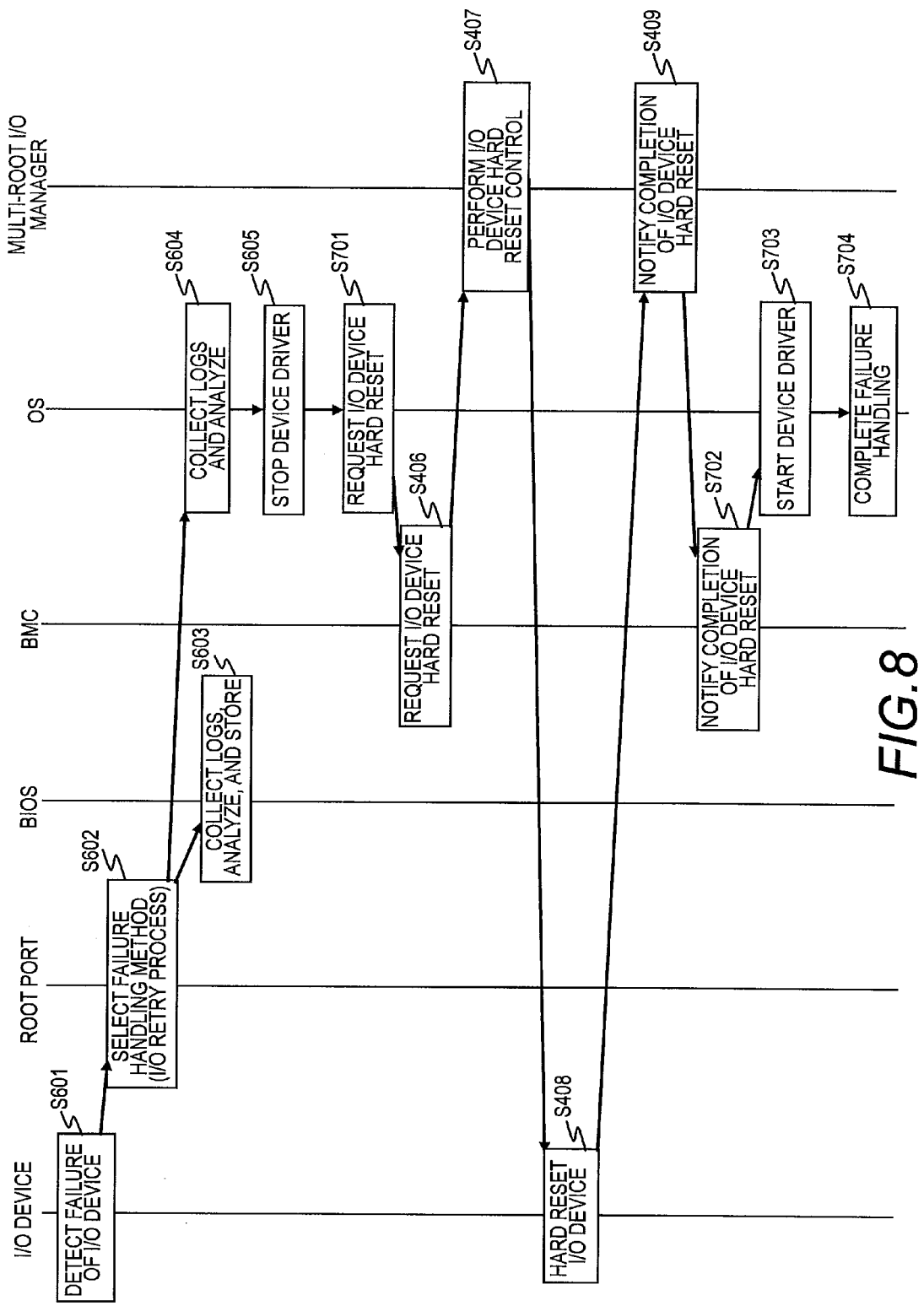
FIG. 8 is a flowchart illustrating an example of the failure handling method (OS retry process (2)) upon an I/O device failure in the compound computer system according to the first embodiment of this invention.

FIG. 4 is a flowchart illustrating an example of the failure handling method (OS stop process) upon an I/O device failure in the compound computer system according to the first embodiment of this invention. FIG. 5 is a flowchart illustrating an example of the failure handling method (OS stop process) upon an I/O device failure in the compound computer system according to the first embodiment of this invention. FIG. 6 is a flowchart illustrating an example of the failure handling method (OS close process) upon an I/O device failure in the compound computer system according to the first embodiment of this invention. FIG. 7 is a flowchart illustrating an example of the failure handling method (OS retry process (1)) upon an I/O device failure in the compound computer system according to the first embodiment of this invention. FIG. 8 is a flowchart illustrating an example of the failure handling method (OS retry process (2)) upon an I/O device failure in the compound computer system according to the first embodiment of this invention.

As illustrated in FIG. 4, in the OS stop process, at an occurrence of a failure of a multi-root I/O device 102, the failure is detected in the multi-root I/O device 102 or a multi-root PCI express switch 101, and the occurrence of failure is notified to the root ports 114 of all computers 100 sharing the multi-root I/O device 102 (Step S301).

Each of the root ports 114 selects a failure handling method designated in advance, the OS stop process in this case, starts the failure handling, and notifies the BIOS 112 of the occurrence of failure (Step S302). The BIOS 112 collects logs relating to the failure, analyzes contents of the failure, stores a result of the analysis in a non-volatile recording medium such as a flash memory (not shown), and notifies the BMC 133 of the result of the analysis (Step S303). It should be noted that the logs relating to the failure are obtained by the OS 111, and are stored in a predetermined area in the memory 135.

The BMC 133 starts OS shutdown control (Step S304), and the OS 111 carries out the shutdown (S305). The BMC 133 carries out a process of stopping a power supply to the computer 100 (Step S306), and the failure handling is completed when the power supply to the computer 100 is stopped (Step S307).

As illustrated in FIG. 5, in the OS reboot process, at an occurrence of a failure of a multi-root I/O device 102, the failure is detected in the multi-root I/O device 102 or a multi-root PCI express switch 101, and the occurrence of failure is notified to the root ports 114 of all computers 100 sharing the multi-root I/O device 102 (Step S401).

Each of the root ports 114 selects a failure handling method designated in advance, the OS reboot process in this case, starts the failure handling, and notifies the BIOS 112 of the occurrence of failure (Step S402). The BIOS 112 collects logs relating to the failure from a predetermined area of the memory 135, analyzes contents of the failure, stores a result of the analysis in a non-volatile recording medium such as a flash memory (not shown), and notifies the BMC 133 of the result of the analysis (Step S403).

The BMC 133 starts the OS shutdown control (Step S404), and the OS 111 carries out the shutdown (S405). The BMC 133 requests the multi-root I/O manager 104 to perform reset in terms of hardware, or so-called hard reset of the multi-root I/O device 102 (Step S406). The multi-root I/O manger 104 carries out hard reset control of the multi-root I/O device 102 (Step S407), and the hard reset of the multi-root I/O device 102 is carried out (Step S408). The multi-root I/O manager 104 identifies the completion of the hard reset of the multi-root I/O device 102, and notifies the BMC 133 of the completion of the hard reset (Step S409). The BMC 133 starts OS boot control (Step S410), the OS 111 is booted up (Step S411), and the failure handling is completed (Step S412).

The I/O close process is a failure handling which stops an I/O device failed while an OS is operating, to thereby allow a continuous operation of the OS. As illustrated in FIG. 6, in the I/O close process, at an occurrence of a failure of a multi-root I/O device 102, the failure is detected in the multi-root I/O device 102 or the multi-root PCI express switch 101, and the occurrence of failure is notified to the root ports 114 of all the computers 100 sharing the multi-root I/O device 102 (Step S501).

Each of the root ports 114 selects a failure handling method designated in advance, the I/O close process in this case, starts the failure handling, and notifies the BIOS 112 of the occurrence of failure (Step S502). The BIOS 112 collects logs relating to the failure from a predetermined area of the memory 135, analyzes contents of the failure, stores a result of the analysis in a non-volatile recording medium such as a flash memory (not shown) (Step S503), and requests the BMC 133 to perform the hard reset of the multi-root I/O device 102 (Step S504).

A process of the hard reset of the I/O device 102 performed by the BMC 133 is the same as the process in Steps S406 to S409 of the OS reboot process illustrated in FIG. 5. After the completion of the hard reset of the multi-root I/O device 102, the BMC 133 notifies the BIOS 112 of the completion of the hard reset of the multi-root I/O device 102 (Step S509), and the failure handling is completed (Step S510).

The I/O retry process is a process of resetting a multi-root I/O device 102 while the OS 111 is operating, and keeping use of the multi-root I/O device 102 when the multi-root I/O device 102 recovers from the failure. According to this embodiment, a description is given of the two cases as variations of the reset of the multi-root I/O device 102 including Function reset in which only a PCI function 120 used by a computer 100 (such as a computer 1 in FIG. 1) is reset without affecting PCI Functions 120 used by other computers 100 (such as computers 2 and 3 in FIG. 1) sharing the multi-root I/O device 102, and hard reset of the multi-root I/O device 102.

As illustrated in FIG. 7, in the OS retry process using the Function reset, at an occurrence of a failure of a multi-root I/O device 102, the failure is detected in the multi-root I/O device 102 or a multi-root PCI express switch 101, and the occurrence of failure is notified to the root ports 114 of all computers 100 sharing the multi-root I/O device 102 (Step S601). Each of the root ports 114 selects a failure handling method designated in advance, the I/O retry process in this case, starts the failure handling, and notifies the BIOS 112 and the OS 111 of the occurrence of failure (Step S602).

The BIOS 112 collects logs relating to the failure from a predetermined area in the memory 135, analyzes contents of the failure, and stores a result of the analysis in a non-volatile recording medium such as a flash memory (Step S603). Meanwhile, the OS 111 collects logs relating to the failure from a predetermined area in the memory 135, analyzes contents of the failure (Step S604), carries out a process of stopping the device driver 110 of the failed multi-root I/O device 102 (S605), and carries out reset control of the PCI function 120 of the multi-root I/O device 102 used by the computer 100 (Step S606).

After completion of the hard reset of the multi-root I/O device 102 (Step S607), the OS 111 carries out a process of restarting the device driver 110 (Step S608), and the failure handling is completed when the multi-root I/O device 102 becomes available again (Step S609).

On the other hand, as illustrated in FIG. 8, in the I/O retry process which is carried out by means of the hard reset, the process from the failure detection to the process of stopping the device drive 110 are performed similarly to Step S601 to Step S605 in the I/O retry process which is carried out by means of the Function reset illustrated in FIG. 7. The OS 111 requests, after the stop of the device driver 110, the BMC 133 to perform the hard reset of the multi-root I/O device 102 (Step S701). A process of the hard reset of the I/O device 102 carried out by the BMC 133 is the same as the process in Steps S406 to S409 of the OS reboot process illustrated in FIG. 5.

After completion of the hard reset of the multi-root I/O device 102, the BMC 133 notifies the OS 111 of the completion of the hard reset of the multi-root I/O device 102 (Step S702), the OS 111 carries out a process of restarting the device driver 110 (Step S703), and the failure handling is completed when the multi-root I/O device 102 becomes available again (Step S704).

In the failure handlings illustrated in FIGS. 3 to 8, for the sake of simple description, the example in which the root port 114 selects the failure handling method is illustrated. Alternatively, respective selection processes carried out by the root port 114, the BIOS 112, and the BMC 133 may function in a cooperative manner to select the failure handling method. Further, when the OS reboot process, the I/O close process, or the I/O retry process fails in the course of the failure handling, another type of a failure handling may be employed. However, the flow thereof is the same as that mentioned before, and a duplicate description thereof is therefore omitted.

Next, a description is given of a control method of the compound computer system according to the first embodiment. First, referring to FIG. 9, a control method carried out by the resource management software 132 at an occurrence of a failure in a multi-root I/O device 102 is described.

Figure 9:
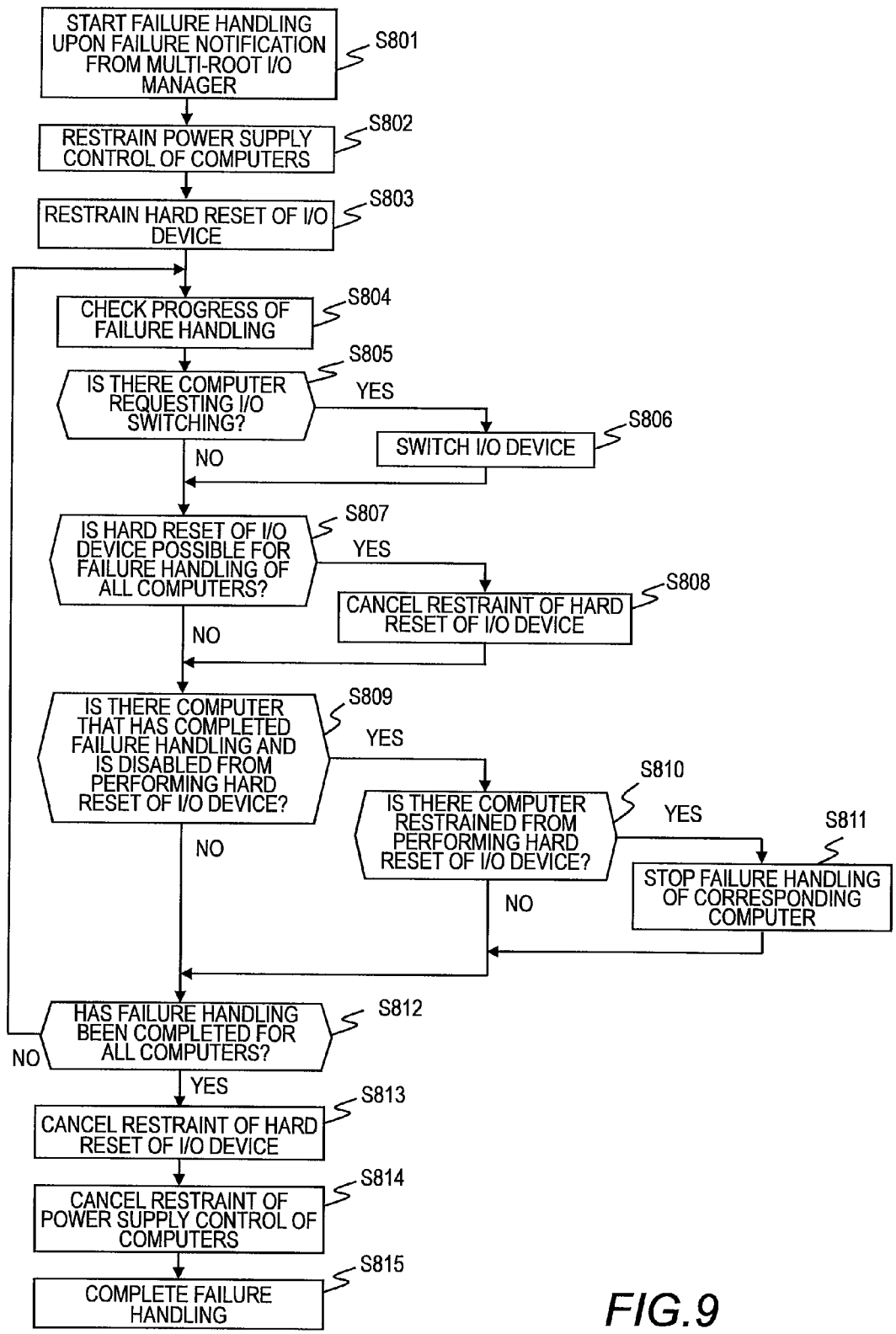
FIG. 9 is a flowchart illustrating an example of the failure handling method carried out by the resource management software 132 upon an I/O device failure in the compound computer system, according to the first embodiment of this invention.

FIG. 9 is a flowchart illustrating an example of the failure handling method carried out by the resource management software 132 upon an I/O device failure in the compound computer system, according to the first embodiment of this invention.

When the failure occurs in a multi-root I/O device 102, the failure handling arbitration module 125 of the resource management software 132 detects, by receiving a failure occurrence notification from the multi-root I/O manager 104, the occurrence of the failure in the multi-root I/O device 102, and starts the failure handling (failure recovery process) (Step S801).

The failure handling arbitration module 125 of the resource management software 132 sets the power supply restraining module 122 operating on the device control computer 103 to restrain each of the computers 100 from carrying out the reset (Step S802). This restrains the power supply control by the management agent 109 or by a user operation on the computers 100 to which the failed multi-root I/O device 102 is assigned, so that the I/O device failure handling of the multi-root I/O device 102 may be carried out by the respective computers 100 without being affected. The power supply control restraint imposed on the computer 100 carried out by the failure handling arbitration module 125 does not include power supply control (such as reboot and stop) of the computer 100 to be carried out in the I/O device failure handling by the respective computers 100. Further, the power supply control restraining module 122 of the device control computer 1030 is provided with a table (not shown) for storing information on a restrained state of the power supply control by each of the computers 100 (each of the computers 1 to 3 of FIG. 1).

Then, the failure handling arbitration module 125 of the resource management software 132 sets the I/O-device-hard-reset restraining module 123 of the multi-root I/O manager 104 to restrain the hard reset of the failed multi-root I/O device 102 (Step S803). As a result, the hard reset is restrained when the hard reset of the multi-root I/O device 102 is requested in the course of the I/O device failure handling by each of the computers 100, to thereby allow other computers 100 to carry out the I/O device failure handling without being affected.

Then, the failure handling arbitration module 125 obtains information on a progress status of the I/O device failure handlings carried out by the respective computers 100, and updates the status information in the failure handling availability status K207 in the I/O device management information 128 (Step S804).

As an example of how the resource management software 132 running on the management server 105 obtains the information on the progress status of the I/O device failure handling, there may be employed a method of obtaining the information on the progress status from the BMC 133 of the each computer 100 via the control I/F 117, the device control computer 1030, and the management network 119, and a method of connecting the each computer 100 to the management network 119 and obtaining the information on the progress status from the management agent 109 via the management network 119. On this occasion, the information on the progress status of the failure handling obtained by the resource management software 132 of the management server 105 from the computer 100 in the course of the failure recovery process of the multi-root I/O device 102 includes information indicating a stage at which the failure handling carried out by the computer 100 is, as illustrated in FIGS. 4 to 8. For example, information on the progress status may be obtained from the BMC 133 which has received the start of the failure handling of the multi-root I/O device 102 from the chipset 113 of the computer 100. The BMC 133 instructs the OS 111 to shut down or start (or restart), monitors the completion of the startup of the OS 111, requests the hard reset of the multi-root I/O device 102, and hence the BMC 133 is capable of monitoring the operation status of the computer 100 in the course of the failure handling. The resource management software 132 of the management server 105 obtains, as information on the progress status of the failure handling, the operation status of the computer 100 detected by the BMC 133 via the device control computer 1030 or the switch management computer 1040.

Then, the resource management software 132 determines whether there is a computer 100 requesting switching of the multi-root I/O device 102 as the failure handling of the multi-root I/O device 102 (Step S805). When there is a computer 100 requesting the switching of the multi-root I/O device 102, a process of switching the multi-root I/O device 102 is carried out (Step S806).

The switching process of the multi-root I/O device 102 will be described later. Next, the failure handling arbitration module 125 of the resource management software 132 determines, based on the status information in the failure handling availability status K207 in the I/O device management software 128 illustrated in FIG. 3, whether the hard reset of the multi-root I/O device 102 is possible in the I/O device failure handling carried out by all the computers 100 sharing the multi-root I/O device 102 (Step S807).

When the hard reset of the multi-root I/O device 102 is possible, the failure handling arbitration module 125 instructs the I/O-device-hard-reset restraining module 123 to cancel the restraint of the hard reset of the multi-root I/O device 102 (Step S808). When the I/O-device-hard-reset restraining module 123 of the multi-root I/O manager 104 receives a hard reset request of the multi-root I/O device 102 from a computer 100 upon the cancel of the hard reset of the multi-root I/O device 102 in Step S808, the I/O-device-hard-reset restraining module 123 carries out the hard reset control, and, upon the completion of the hard reset, sets the computer 100 to the hard reset restrained state. Therefore, the I/O-device-hard-reset restraining module 123 of the multi-root I/O manager 104 is provided with a table storing information indicating whether the hard reset is restrained or not for each of the multi-root I/O devices 102 (each of the I/O devices 1 to 4 of FIG. 1).

Then, the failure handling arbitration module 125 of the resource management software 132 determines whether, of all the computers 100 sharing the multi-root I/O device 102, there is a computer 100 which has completed the failure handling of the multi-root I/O device 102 and may not perform the hard reset of the multi-root I/O device 102 (Step S809). When there is a computer 100 meeting the conditions in Step S809, the failure handling arbitration module 125 determines whether, of all the computers 100 sharing the multi-root I/O device 102, there is a computer 100 which is in the course of the failure handling of an I/O device and is restrained from the hard reset of the multi-root I/O device 102 (Step S810). When there is a computer 100 meeting the conditions in Step S810, stops the failure handling of the multi-root I/O device 102 by the corresponding computers 100 is stopped (S811).

Then, the failure handling arbitration module 125 determines whether the failure handlings of an I/O device by all the computers 100 sharing the multi-root I/O device 102 have been completed (Step S812). When the failure handlings of an I/O device by the all the computers 100 have not been completed, the failure handling arbitration module 125 returns to the acquisition of information on the progress status of the failure handling in Step S804, and carries out again the processing from Step S804 to Step S812.

On the other hand, when the failure handlings of an I/O device by the all the computers 100 have been completed, the resource management software 132 cancels the restraint of the hard reset of the multi-root I/O device 102 imposed by the I/O-device-hard-reset restraining module 123 of the multi-root I/O manager 104 (Step S813).

Then, the failure handling arbitration module 125 of the resource management software 132 cancels the reset restraint imposed on the computers 100 by the power supply control restraint module 122 in the device control module 103 running on the device control computer 1030 (Step S814), and completes the failure handling of the multi-root I/O device 102 (Step S815).

Figure 11:
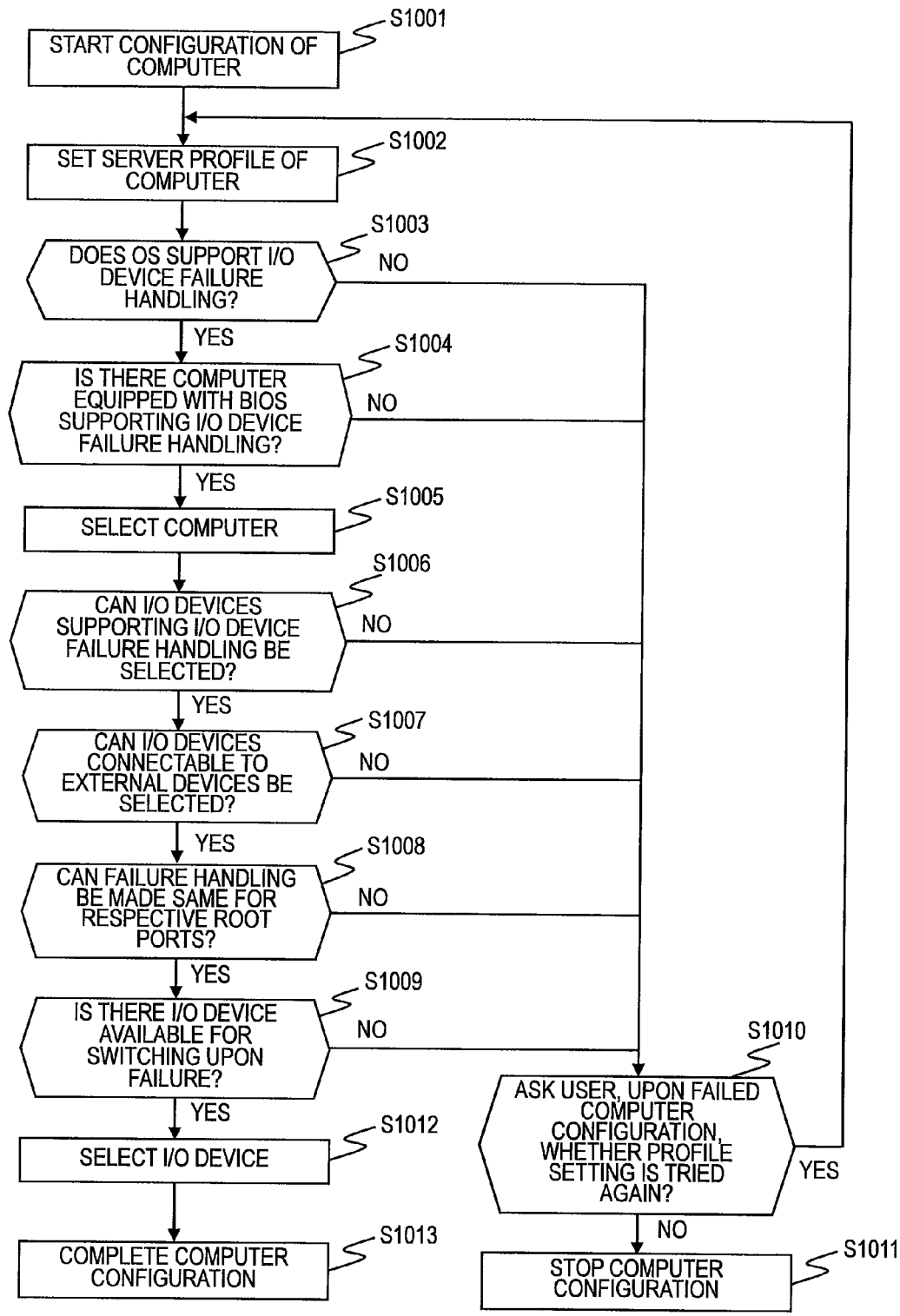
FIG. 11 is a flowchart illustrating an example of the configuration method of a computer 100 in the compound computer system according to the first embodiment of this invention.
Figure 12:
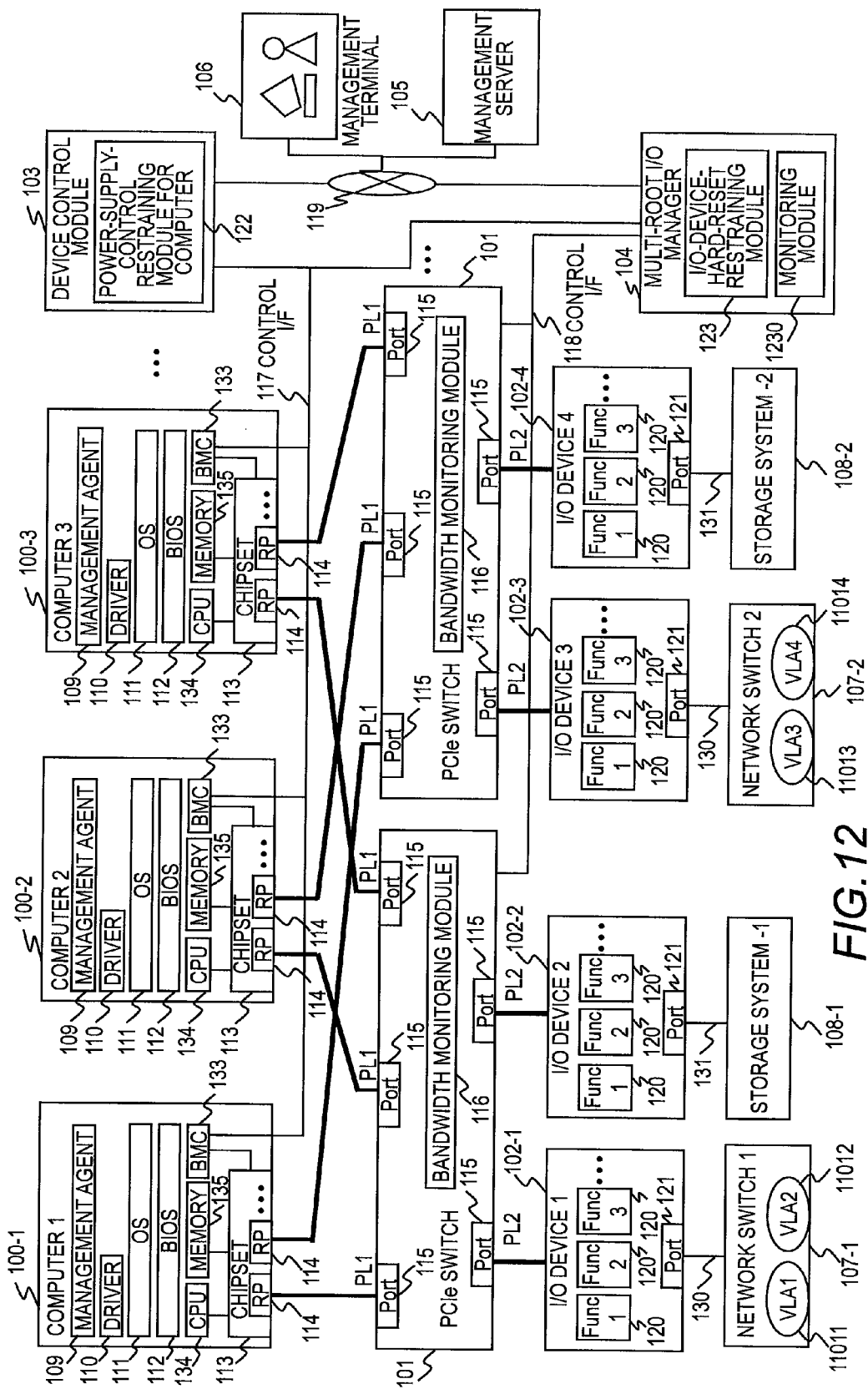
FIG. 12 illustrates an example of connections of the compound computer system to external devices according to the first embodiment of this invention.
Figure 13:
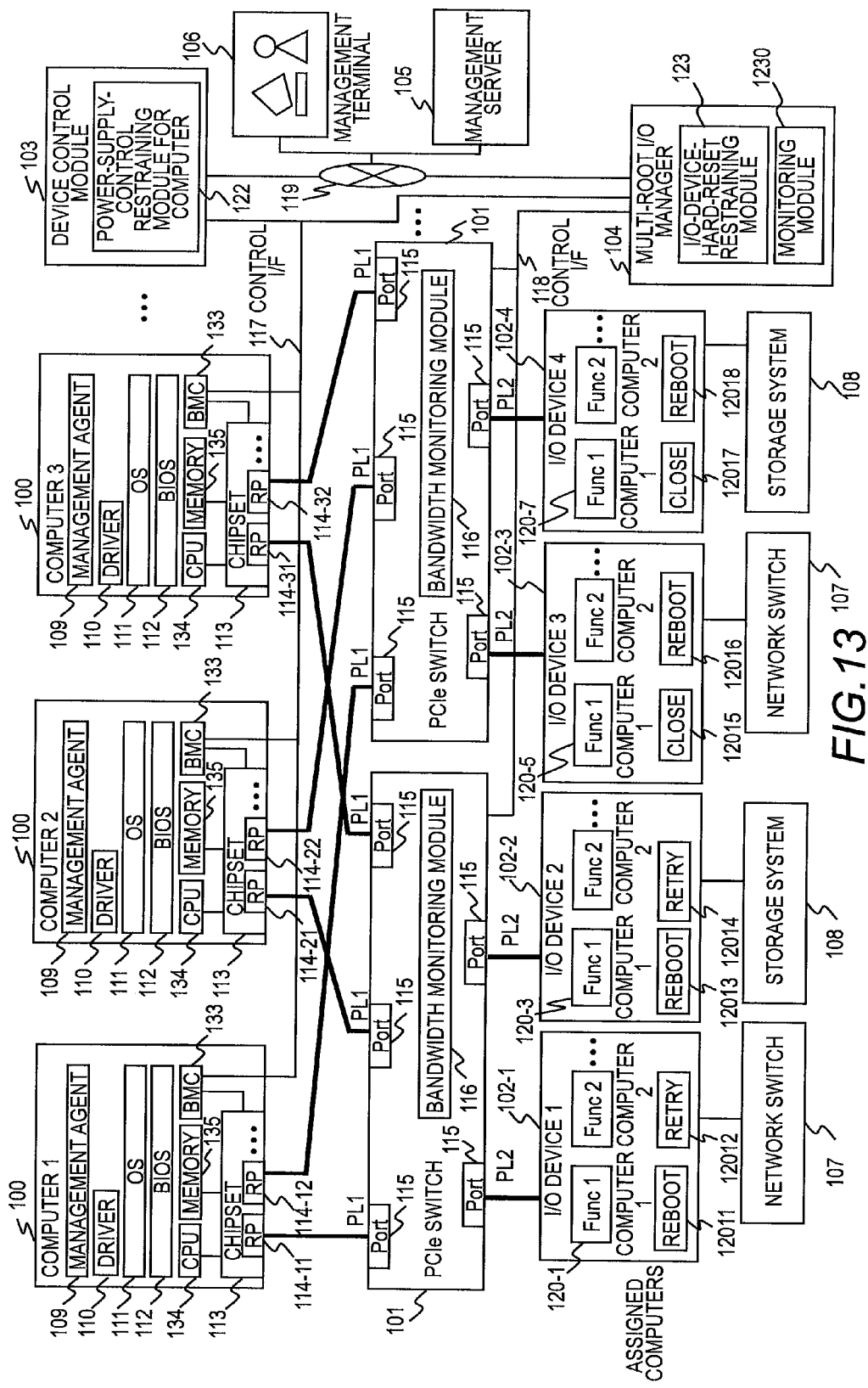
FIG. 13 illustrates an example of designating a failure handling method for each of the root ports 114 of the compound computer system according to the first embodiment of this invention.

Next, referring to FIGS. 11 to 13, a description is given of a control method for the compound computer system when the administrator who is a user of the computer 100 uses the management terminal 106 to configure a computer 100 for newly configuring a server.

FIG. 11 is a flowchart illustrating an example of the configuration method of a computer 100 in the compound computer system according to the first embodiment of this invention. FIG. 12 illustrates an example of connections of the compound computer system to external devices according to the first embodiment of this invention. FIG. 13 illustrates an example of designating a failure handling method for each of the root ports 114 of the compound computer system according to the first embodiment of this invention.

The resource management software 132 selects a configuration of a computer 100, namely, a computer 100 and a multi-root I/O device 102, from the compound computer system, according to a computer specification requested from the management terminal 106 by the administrator of the computers 100, and assigns the multi-root I/O device 102 to the computer 100, to thereby carry out initial configuration of the computer 100. The computer specification requested by the administrator of the computers 100 from the management terminal 106 is referred to as server profile 127.

As illustrated in FIG. 11, a request from the management server 106 operated by the administrator of the computers 100 causes the management server 105 to start a configuration process of a computer 100 (Step S1001).

The administrator of the computers 100 requests, from the management terminal 106, the resource management software 132 to provide required specifications of the computer 100 as a server profile 127 (Step S1002). As described before, the server profile 127 includes specification information on a computer 100, and contains specification information on the CPU 134, the memory 135, the multi-root I/O device 102, the OS 111, and the like. Of the sever profile 127, information relating to the multi-root I/O device 102 according to this embodiment contains the information represented in the tabular form FT9 of FIG. 10.

Then, the physical resource assignment control module 124 of the resource management software 132 determines whether the type of the OS specified in the server profile 127 supports the failure handling method K903 of the specified multi-root I/O device 102 (Step S1003).

Then, the physical resource assignment control module 124 determines, of computers 100 in the compound computer system which are not used by users, whether there is a computer 100 equipped with the BIOS 112 supporting the failure handling method K903 specified in the server profile 127 (Step S1004).

Then, the physical resource assignment module 124 selects a computer 100 which meets the condition designated in Step S1004 (S1005). Then, the physical resource control module 124 determines, of multi-root I/O devices 102 which are not used by users in the compound computer system, whether there are multi-root I/O devices 102 supporting the failure handling method K903 of an I/O device specified in the server profile 127 (Step S1006).

Then, the physical resource assignment control module 124 determines whether the multi-root I/O devices 102 meeting the condition in Step S1006 may be connected to specified external devices K905 specified in the server profile 127 such as the network switch 107 and the storage system 108 (Step S1007).

Referring to FIG. 12, a description is given of how to select a multi-root I/O devices 102 which may be connected to an external devices. In FIG. 12, as compared with the block diagram of the compound computer system according to the first embodiment of this invention illustrated in FIG. 1, in order to differentiate the same components, the computers 100 are respectively denoted by 100-1, 100-2, and 100-3, the multi-root I/O devices 102 are respectively denoted by 102-1, 102-2, 102-3, and 102-4, the network switches 107 are respectively denoted by 107-1 and 107-2, the storage systems 108 are respectively denoted by 108-1 and 108-2; and virtual local area networks (VLAN) configured by the network switches 107 are respectively denoted by 11011, 11012, 11013, and 11014, for example.

In the configuration illustrated in FIG. 12, a multi-root I/O device 102 with the I/O device number of "1" in the server profile 127 of FIG. 10 is a "GbE NIC", the information on external device K905 is "VLAN1", and hence a multi-root I/O device 1 (102-1) connectable to a VLAN1 (11011) of the network switch 1 (107-1) of FIG. 12 is selected whereas a multi-root I/O device 2 (102-3) connected to a network switch 2 (107-2) is not selected.

Further, for a multi-root I/O device 102 with the I/O device number of "4" in the server profile 127 of FIG. 10 is a "FC-HBA (1G)", the information on external device K905 is "STORAGE DEVICE 1", and hence a multi-root I/O device 1 (102-2) connectable to a storage system 1 (108-1) of FIG. 12 is selected whereas a multi-root I/O device 4 (102-4) is not selected.

Then, the physical resource assignment control module 124 determines, of the multi-root I/O devices 102 meeting the condition designated in Step S1007, whether there are multi-port I/O devices 102 capable of employing the failure handling method K903 of an I/O device which may be made the same for the each root port 114 of the computer 100 (Step S1008).

Referring to FIG. 13, a description is given of an example of the method for selecting a multi-root I/O device 102 which employs the same failure handling method of an I/O device for each of root ports 114 in Step S1008.

In FIG. 13, as compared with the block diagram of the compound computer system according to the first embodiment of this invention illustrated in FIG. 1, in order to differentiate the same components, the computers 100 are respectively denoted by 100-1, 100-2, and 100-3, the multi-root I/O devices 102 are respectively denoted by 102-1, 102-2, 102-3, and 102-4, and the root ports 114 are respectively denoted by 114-11, 114-12, 114-21, 114-22, 114-31, and 114-32. Further, for each of the PCI Functions 120 of the multi-root I/O devices 102-1, 102-2, 102-3, and 102-4, there are additionally provided assigned computers and the I/0 device failure handling methods 12011, 12012, 12013, 12014, 12015, 12016, 12017, and 12018.

In the example illustrated in FIG. 13, the computer 1 (100-1) is assigned the PCI Function 120-1 and 120-3 via the root port 114-11, and the PCI Function 120-5 and 120-7 via the root port 114-12. In this example, when the same failure handling method for the I/O device is employed for each of the root ports 114, the same failure handling methods of an I/O device is employed for the PCI Function 120-1 and the PCI Function 120-3 in the case of the root port 114-11, which are the same OS reboot processes in this example.

Further, in the case of the root port 114-12, the same failure handling methods of an I/O device is employed for the PCI Function 120-5 and the PCI function 120-7 which are the same I/O close processes.

On the other hand, for example, the PCI Function 120-1 and the PCI Function 120-5 of the computer 1 (100-1) have the root ports 114 different from each other, and hence the I/O device failure handling methods of an I/O device may be different from each other, which may be respectively the OS reboot process and the I/O close process.

When the I/O device switching upon failure K904 is "YES" in the server profile 127, that is, the I/O device switching is designated, the physical resource assignment control module 124 determines, of multi-root I/O devices 102 which are not used by users in the compound computer system, whether an I/O device available for switching may be selected (Step S1009). This determination carries out the same determination process as in Steps S1006, S1007, and S1008 described above. In other words, whether the multi-root I/O device 102 supports the failure handling method of an I/O device, whether the multi-root I/O device 102 is connectable to the external device, and whether the same failure handling method may be employed for each of the root ports 114 are determined.

After these determinations are made, the physical resource assignment control module 124 selects a multi-root I/O device 102 to be assigned to the computer 100, notifies the multi-root I/O manager 104 of the assignment of the multi-root I/O device 102 to the computer 100, to thereby cause the multi-root I/O manager 104 to set the PCI Express switch 101 (Step S1012), and the configuration of the computer 100 is completed (Step S1013).

On the other hand, when a result of the determination is negative in Step S1003, S1004, S1006, S1007, S1008, or S1009, the resource management software 132 notifies the management terminal 106 of the administrator of the computers 100 of the fact that a computer 100 may not be configured to the specification requested by the server profile 127, and determines whether or not to try again the setting of the server profile 127 (S1010). When the administrator of the computers 100 gives, from the management terminal 106, a notification that the setting of the server profile 127 is to be tried again, the resource management software 132 returns to Step S1002, and tries the setting of the server profile 127. On the other hand, when the resource management software 132 receives, from the management terminal 106 operated by the administrator of the computers 100, a notification that the setting of the server profile 127 is not to be tried again, the configuration of the computer 100 is stopped (Step S1011).

As a result of the above process, the physical resource assignment control module 124 of the management server 105 may assign, according to the server profile 127 received from the management terminal 106, the multi-root I/O device 102 and the external device to the computer 100.

In the processing in Step S1008, for each root port 114 on the PCI bus provided by the chipset 113, when the failure handling method K903 designated by the serve profile 127 may be executed for all I/O devices (multi-root I/O devices 102) assigned to a PCI tree below the each root port 114, a physical resource may be assigned.

Figure 15:
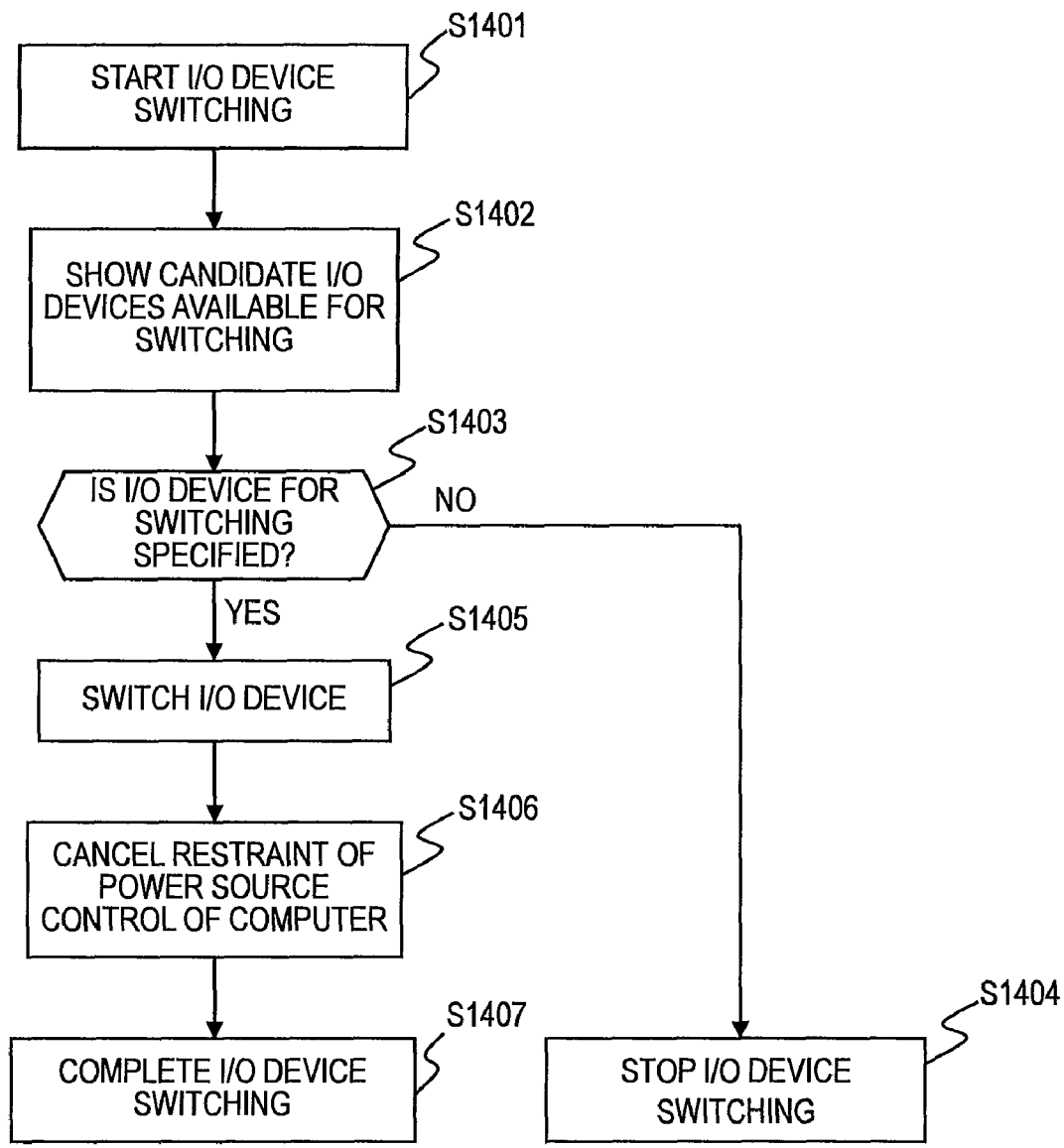
FIG. 15 is a flowchart illustrating an example of the I/O device switching method upon an I/O device failure in the compound computer system according to the first embodiment of this invention.
Figure 16:
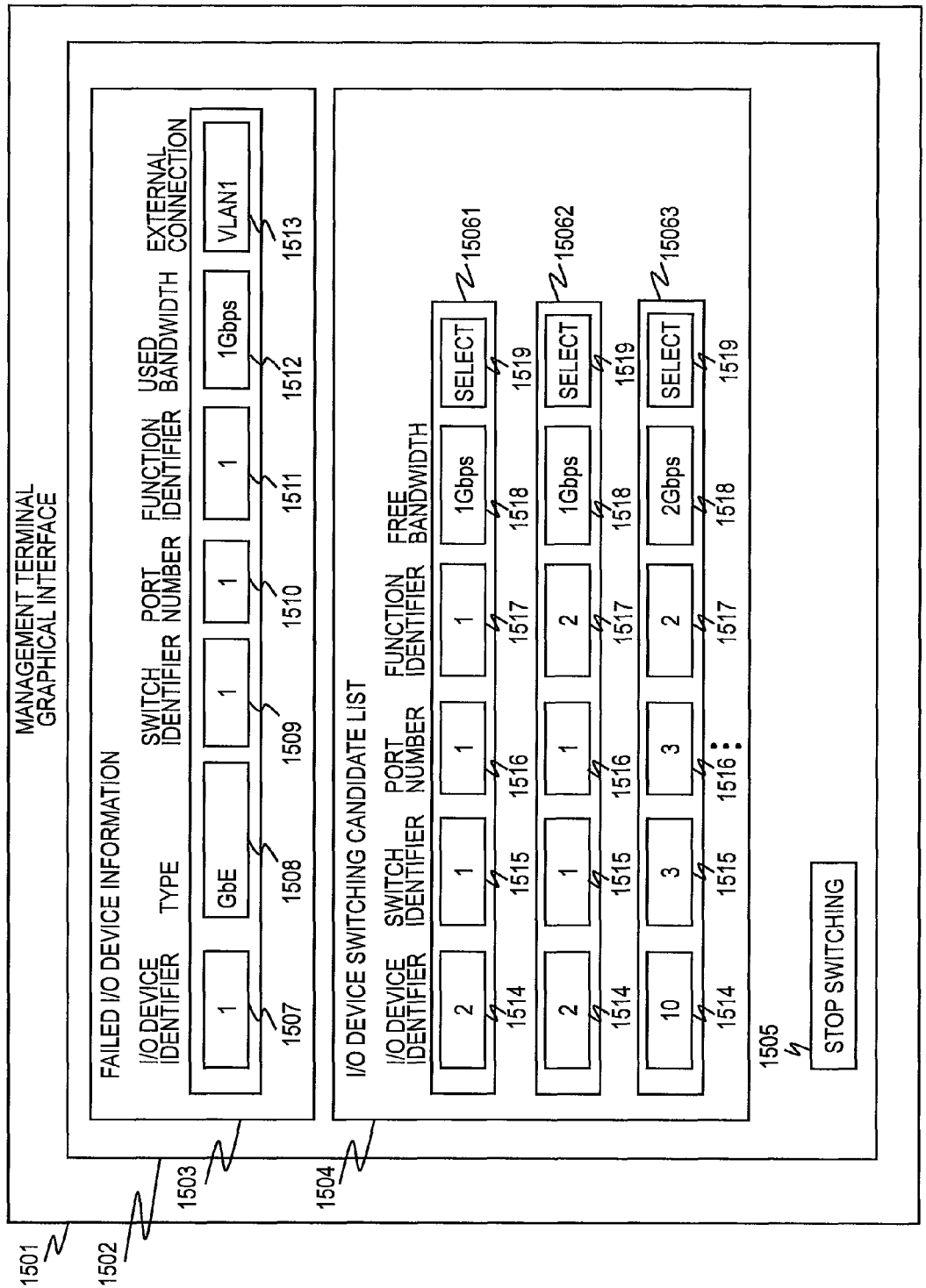
FIG. 16 illustrates an example of a graphical interface used for selecting an I/O device as a candidate of the switching upon an I/O device failure in the compound computer system according to the first embodiment of this invention.

Next, a description is given of a control method of the compound computer system for a case in which an IO device is replaced with another I/O device as a failure handling when a failure has occurred in the I/O device, with reference to FIGS. 15 and 16.

FIG. 15 is a flowchart illustrating an example of the I/O device switching method upon an I/O device failure in the compound computer system according to the first embodiment of this invention. FIG. 16 illustrates an example of a graphical interface used for selecting an I/O device as a candidate of the switching upon an I/O device failure in the compound computer system according to the first embodiment of this invention.

The I/O device switching process at an occurrence of a failure in a multi-root I/O device 102 is a failure handling method which assigns, in place of a failed multi-root I/O device 102, another multi-root I/O device 102 which is not used in the compound computer system, to a computer 100, to thereby recover the failure.

As illustrated in FIG. 15, the I/O device switching process is activated by the switching of the I/O device in Step S806 in FIG. 9 (Step S1401). The I/O switching control module 126 of the resource management software 132 notifies, based on the I/O device management information 128 in FIG. 14, the management terminal 106 operated by the administrator of the computer 100 of candidate multi-root I/O devices 102 for the switching (Step S1402).

Then, the I/O device switching control module 126 determines whether a multi-root I/O device 102 for switching is designated from the management terminal 106 operated by the administrator of the computers 100 (Step S1403). When a multi-root I/O device 102 is not designated, or stop of the I/O device switching is designated, the I/O device switching is stopped (Step S1404).

On the other hand, when a multi-root I/O device for switching is selected, the I/O device switching control module 126 carries out setting with respect to the multi-root I/O manager 104 so that the assignment of the failed multi-root I/O device 102 to the computer 100 is cancelled, and the multi-root I/O device 102 for switching is assigned to the computer 100 (Step S1405). This setting is carried out by the management server 105 updating the assigned computer K203 in the I/O device management information 128.

Then, the I/O device switching control module 126 cancels the power supply control restraint imposed on this computer 100, and carries out setting so that the administrator of the computers 100 may power on (or restart), at the management terminal 106 via the management server 105, from the device control computer 1030 (Step S1406), and the switching of the I/O device is completed (Step S1407).

Referring to FIG. 16, a description is given of an example of the graphical interface which is used to specify an I/O device for switching in Step S1402 of FIG. 15, and is output to the management terminal 106 operated by the administrator of the computers 100. A graphical interface 1501 displayed on the management terminal 106 includes a management screen 1502 of the resource management software 132, and, as a graphical interface for the I/O device switching, provides information 1503 on a failed multi-root I/O device 102, a list 1504 of candidate multi-root I/O devices 102 for switching, and a setting portion 1505 for specifying the stop of the switching of the I/O device.

The information 1503 on the failed multi-root I/O device 102 includes an identifier 1507 of the multi-root I/O device 102, a type 1508 of the multi-root I/O device 102, an identifier 1509 and a port number 1510 of a multi-root PCI Express switch 101 to which the multi-root I/O device 102 is connected, an identifier 1511 of a PCI Function 120 of the multi-root I/O device 102, a bandwidth information 1512 of the multi-root I/O device 102 which is used by the computer 100, and is obtained by the bandwidth monitoring module 116, and information 1513 on an external device which is connected to the multi-root I/O device 102. Further, the list 1504 of the candidate multi-root I/O devices 102 for switching displays pieces of information 15061, 15062, and 15063 on each of the PCI Functions of the candidate multi-root I/O devices 102.

In the example illustrated in FIG. 16, three candidates 15061, 15062, and 15063 for each of the PCI Functions are illustrated. Information on the candidate multi-root I/O devices 102 for switching includes an identifier 1514 of a multi-root I/O device 102, an identifier 1515 and a port number 1516 of a multi-root PCI Express switch 101 to which the multi-root I/O device 102 is connected, an identifier 1517 of a PCI Function of the multi-root I/O device 102, a free bandwidth information 1518 of the multi-root I/O device 102 obtained by the bandwidth monitoring module 116, and is calculated by the failure handling arbitration module 125, and a setting portion 1519 used by the administrator of the computers 100 for selecting one of the candidates 15061 to 15063 of the functions (Functions) of the multi root I/O device 102 at the management terminal 106 operated by the administrator.

As mentioned above, according to the first embodiment of this invention, the administrator, at the management terminal 106, defines the specifications of the computers 100 (computers 1 to 3), which include the failure handling content used when the multi-root I/O device fails in the server profile 127 of the management server 105. Then, the failure handling contents include, as the processes at the time of a failure for each multi-root I/O device 102, stop, reboot, close, retry, and I/O switching.

Based on the server profile 127, the physical resource assignment control module 124 of the resource management software 132 of the management server 105 assigns resources of the compound computer system to the respective computers 100 (computers 1 to 3).

The resource management software 132, upon assignment of a resource, checks the configurations of the computers 100 so that the failure handling method K903 specified in the server profile 127 is available.

In other words, the resource management software 132 assigns a resource to a computer 100 when the OS 111 and the BIOS 112 support the failure handling specified in the server profile 127, when all multi-root I/O devices 102 under the root port 114 of the computer 100 may be set to the same failure handling, and, when switching of a multi-root I/O device 102 is carried out when a failure has occurred. The candidate multi-root I/O device 102 for switching may be selected according to the combination of the computer 100 associated with the candidate multi-root I/O device 102 for switching, the multi-root I/O device 102, and the external device.

The PCI Express switches 101 are monitored by the multi-root I/O manager 104 of the switch management computer 1040, and the multi root I/O manager 104, when the multi-root I/O device 102 fails, notifies the resource management software 132 of the management server 105 of the occurrence of the failure.

The resource management software 132, upon reception of the notification of the failure occurring in the multi-root I/O device 102, causes the failure handling arbitration module 125 to restrain, according to respective failure handling methods of computers 100 sharing the multi-root I/O device 102, the hardware reset of the multi-root I/O device 102 until the close and retry processes are completed, or to restrain the reboot when the failure handling is reboot. Further, if the retry is successful, the hardware reset is not carried out, and the computers 100 may thus continue their tasks, thereby securing availability of the compound computer system.

The I/O device switching control module 126 of the resource management software 132 proposes, in the failure handling, with regard to the /O device for switching among the multi-root I/O devices 102, to the management terminal 106, candidates of the multi-root I/O device 102 for switching and free bandwidths (free throughput) of the respective candidates, and instructs the administrator to select a multi-root I/O device 102 to be switched, and the resource management software 132 notifies the multi-root I/O manager 104 of the switch management computer 1040 of a multi-root I/O device 102 to be switched received from the management terminal 106, and assigns the selected multi-root I/O device 102 to the computer 100.

With the above-mentioned configuration, the resource management software 132 of the management server 105, in the compound computer system including the plurality of computers 100 and the plurality of multi-root I/O devices 102, selects an OS 111 and a BIOS 112 which may handle a failure of a multi-root I/O device 102, and a setting of the root port 114 of the chipset 113, and configure computers 100. As a result, even when a multi-root I/O device 102 fails, the failure handling arbitration module 125 of the management server 105 may carry out the failure handling executable according to the configuration of the computer 100, and thus, the failure handling of the multi-root I/O device 102 shared by the plurality of computers 100 may be smoothly carried out.

Then, even when the failure recovery processes at an occurrence of a failure (retry, I/O close, OS reboot, and OS stop) by each of the plurality of computers 100 sharing the multi-root I/O device 102 are different from each other, the failure handling arbitration module 125 avoids conflicts of the failure recovery processes among the computers 100, resulting in smooth failure recovery processes. For example, when, in FIG. 1, the failure recovery process by the computer 1 is the retry, and the failure recovery process by the computer 2 is the OS reboot, the management server 105 instructs the I/O-device-hard-reset restraining module 123 of the multi-root I/O manager 104 to inhibit the OS reboot by the computer 2, and thus the multi-root I/O manager 104 may inhibit the restart by the BMC 133 of the computer 2. Thus, during the retry of the multi-root I/O device 102 by the computer 1, the hard reset of the multi-root I/O device 102 may be restrained.

Further, when the computer 100 switches a failed multi-root I/O device 102 to another multi-root I/O device 102 at an occurrence of a failure, the management server 105, based on the server profile 127, the I/O device management information 128, and the bandwidth information obtained by the bandwidth monitoring module 116 of the PCI Express switches 101, may propose candidate multi-root I/O devices 102 for switching, thereby securely switching the I/O device.

Second Embodiment

A description is given of a configuration of a compound computer system according to a second embodiment of this invention. The compound computer system according to the second embodiment is the same as the compound computer system according to the first embodiment of this invention illustrated in FIG. 1 except for the I/O device management information 128 illustrated in FIG. 3 and the failure handling methods employed by the resource management software 132 at an occurrence of a failure in an I/O device in the compound computer system illustrated in FIG. 9. Thus, a description is given below of only the portions different from these according to the first embodiment, and a description is not given of the same portions.

FIG. 17 illustrates an example of the I/O device management information 128 held by the management server 105 of the compound computer system according to the second embodiment.

As illustrated in FIG. 17, the I/O device management information 128 represented in a tabular form FT16 is the I/O device management information 128 according to the first embodiment illustrated in FIG. 3 with an addition of information K1601 indicating a priority of a failure handling of a multi-root I/O device.

The priority information K1601 of a failure handling indicates that a failure handling by a computer 100 having a higher priority indicated by the priority information K1601 is extracted when a multi-root I/O device 102 is shared by a plurality of computers 100. According to this embodiment, a larger value in the priority information K1601 of the failure handling corresponds to a higher priority.

Figure 18:
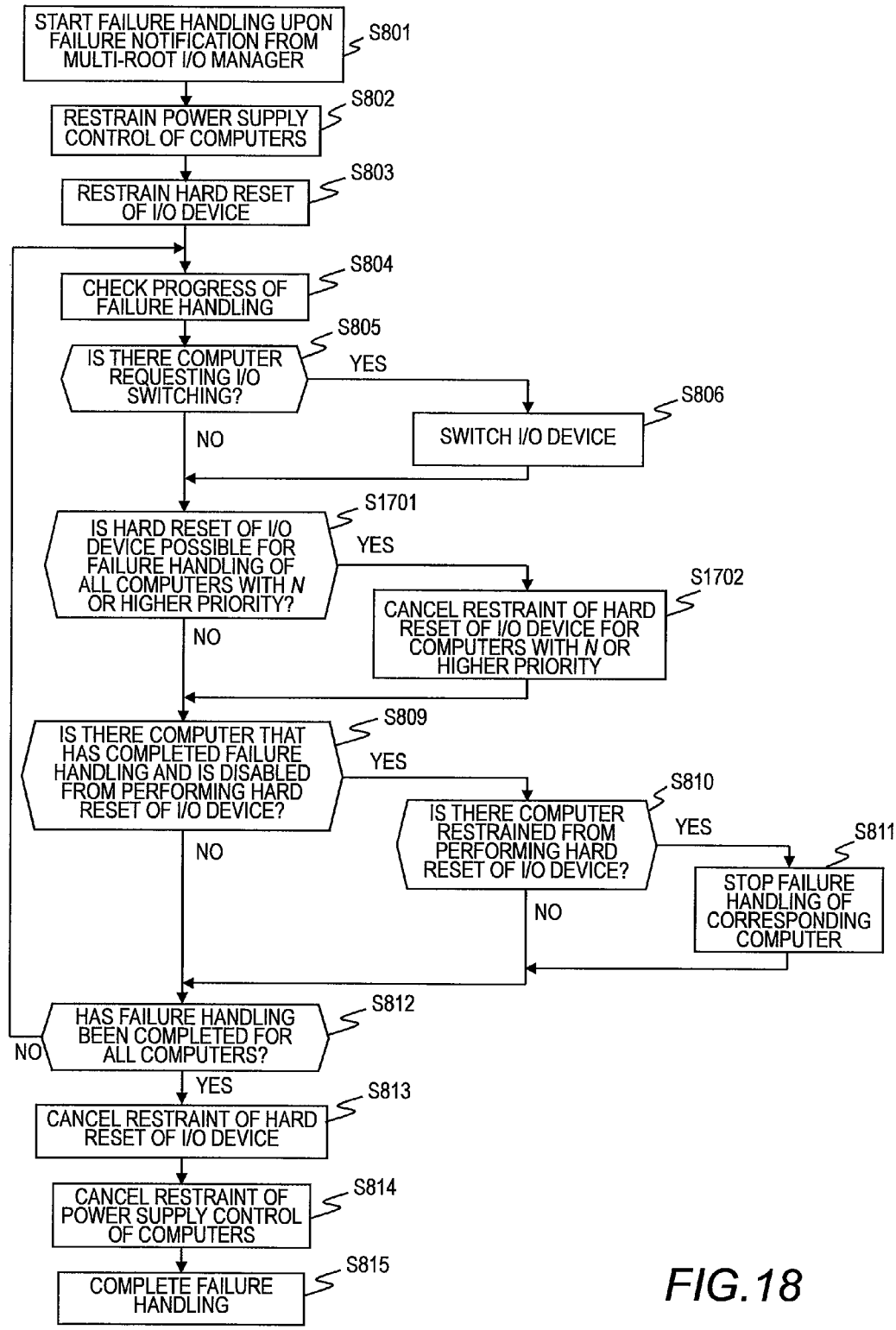
FIG. 18 is a flowchart illustrating an example of the failure handling method carried out by the resource management software 132 at an occurrence of a failure in an I/O device in the compound computer system according to the second embodiment of this invention.

Now, referring to FIG. 18, a control method according to the second embodiment carried out by the resource management software 132 at an occurrence of a failure in a multi-root I/O device 102 is described.

FIG. 18 is a flowchart illustrating an example of the failure handling method carried out by the resource management software 132 at an occurrence of a failure in an I/O device in the compound computer system according to the second embodiment of this invention.

As illustrated in FIG. 18, in the failure handling method according to the first embodiment illustrated in FIG. 9, Step S807, in which it is determined whether the hard reset is possible in the failure handling of an I/O device by all the computers 100 to which the multi root I/O device 102 is assigned, and Step S808, in which, when it is determined in Step S807 that the hard reset is possible, the I/O-device-hard-reset restraining module 123 is instructed to cancel the hard reset restraint of the multi-root I/O device 102, are replaced by Steps S1701 and S1702 of FIG. 18, and the other steps remain the same as those of the first embodiment.

In other words, according to the second embodiment, the failure handling arbitration module 125 determines, based on the status information in the failure handling availability status K207 and the priority information K1601 of the failure handling in the I/O device management information 128, whether the hard reset of the I/O device is possible in failure handlings by all the computers 100 having a priority equal to or higher than a predetermined value N, to which the multi-root I/O device 102 is assigned (Step S1701).

When the hard reset is possible in the multi-root I/O device 102, the failure handling arbitration module 125 instructs the I/O-device-hard-reset restraining module 123 to cancel the restraint of the hard reset of the multi-root I/O device 102 imposed on the computers 100 with a priority equal to or higher than N (Step S1702). It should be noted that the determination for the priority N is carried out for all the priorities of 0, 1, . . . , and N (N is an integer larger than zero) in Steps S1701 and S1702. According to the second embodiment, when a multi-root I/O device 102 is shared by a plurality of computers 100, a failure handling of an I/O device by computers 100 with a higher priority may prioritized in execution.

Third Embodiment

A description is given of a configuration of a compound computer system according to a third embodiment of this invention. The compound computer system according to the third embodiment is the same as the compound computer system according to the first embodiment of this invention illustrated in FIG. 1 except for the hard reset control of an I/O device performed by the multi-root I/O manager 104. Thus, a description is given below of only the portions different from these according to the first embodiment, and a description will not given of the same portions.

Figure 19:
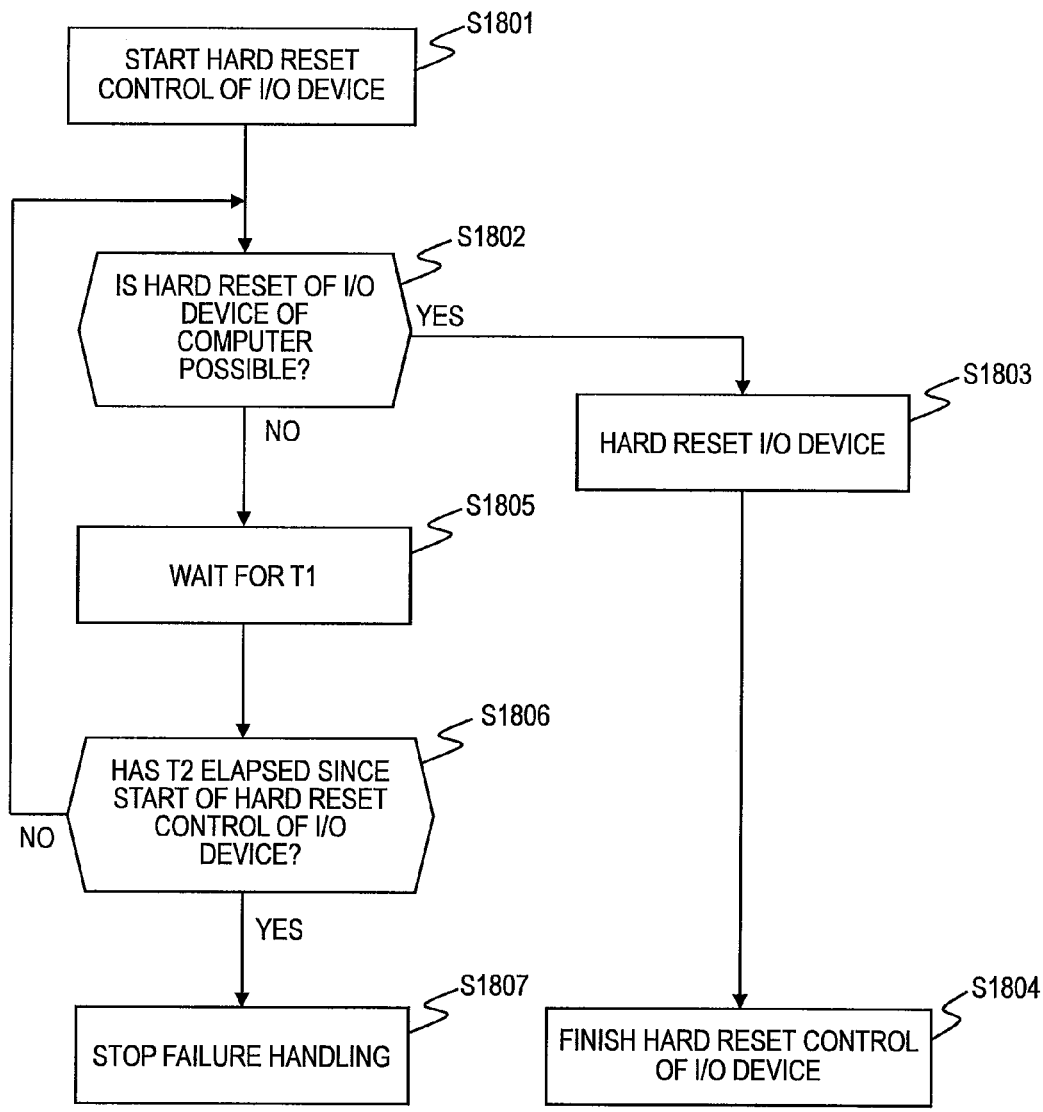
FIG. 19 is a flowchart illustrating an example of the hard reset control method of an I/O device of the compound computer system according to the third embodiment.

FIG. 19 is a flowchart illustrating an example of the hard reset control method of an I/O device of the compound computer system according to the third embodiment. According to the third embodiment, the control portion of the I/O device hard reset control (Step S407 of FIG. 5) by the multi-root I/O manager 104 illustrated in FIGS. 5, 6, and 8 according to the first embodiment is replaced by the control illustrated in FIG. 19.

In other words, as illustrated in FIG. 19, the multi-root I/O manager 104, upon reception of a request for hard reset of a multi-root I/O device 102 from a BMC 133 or a computer 100, starts the hard reset control of the multi-root I/O device 102 (Step S1801).

Then, the multi-root I/O manager 104 determines whether the restraint of the hard reset of the multi-root I/O device 102 is canceled for the computer 100 which has requested the hard reset (Step S1802). When the restraint of the hard reset is cancelled, and the hard reset is possible, the hard reset control of the multi-root I/O device 102 is carried out (Step S1803), and, upon completion of the hard reset of the multi-root I/O device 102, the hard reset control is completed (Step S1804).

On the other hand, when it is determined in Step S1802 that the hard reset is restrained, and the hard reset is impossible, the multi-root I/O manager 104 waits for a predetermined period T1 (Step S1805), further determines whether a predetermined period T2 has elapsed since the time point of the start of the hard reset control of the I/O device in Step S1801 (Step S1806). When the period T2 has not elapsed, the multi-root I/O manager 104 returns to Step S1802, and determines again whether the hard reset of the multi-root I/O device 102 is possible.

On the other hand, when the predetermined period T2 has elapsed, the failure handling of an I/O device by the computer 100 is stopped (S1807). The predetermined periods T1 and T2 are periods set in advance as initial values upon manufacture of the complex computer system, or as values set by the management terminal 106 operated by the administrator of the computers 100.

According to the third embodiment, for example, the hard reset of a multi-root I/O device 102 by a computer 100 which is fast in progress of the failure handling is delayed according to a computer 100 which is slow in progress of the failure handling.

Fourth Embodiment

A description is given of a configuration of a compound computer system according to a fourth embodiment of this invention. The compound computer system according to the fourth embodiment is, as in the third embodiment, the same as the compound computer system according to the first embodiment of this invention illustrated in FIG. 1 except for the hard reset control of an I/O performed by the multi-root I/O manager 104. Thus, a description is given below of only the portions different from these according to the first embodiment, and a description will not given of the same portions.

Figure 20:
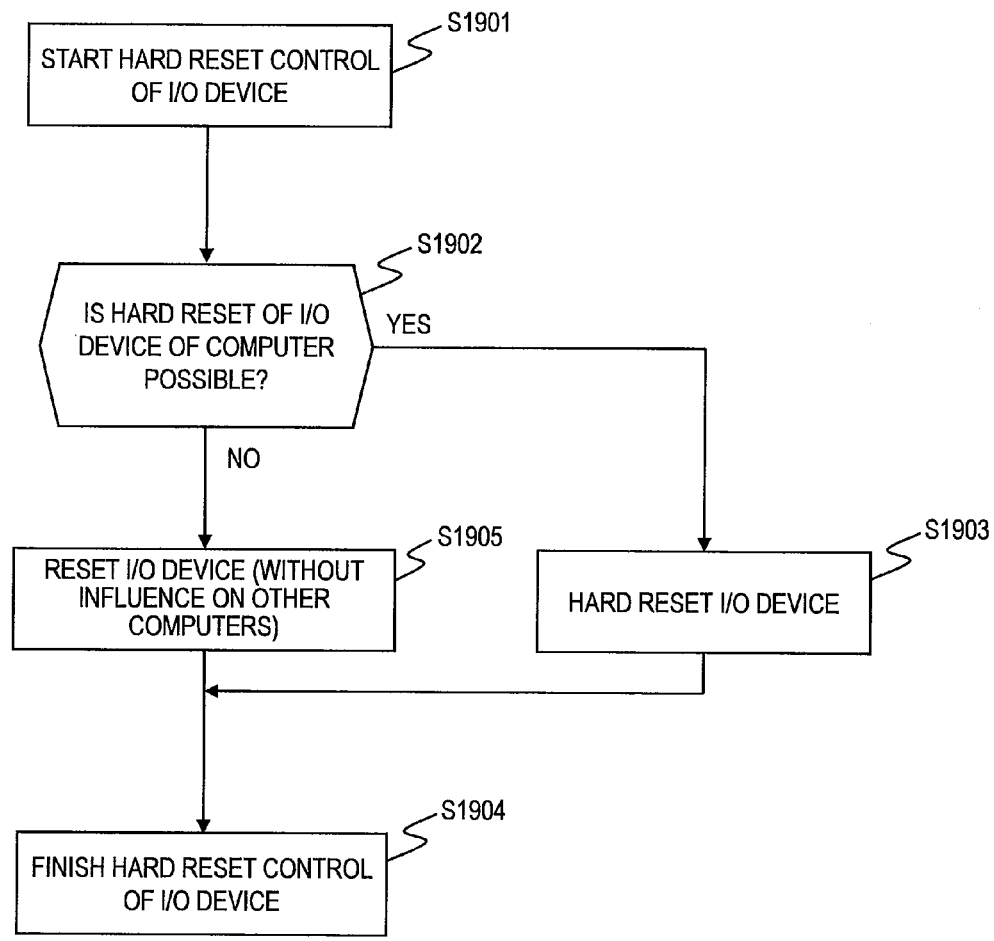
FIG. 20 is a flowchart illustrating an example of the hard reset control method of an I/O device of the compound computer system according to the fourth embodiment.

FIG. 20 is a flowchart illustrating an example of the hard reset control method of an I/O device of the compound computer system according to the fourth embodiment. According to the fourth embodiment, the control portion of the I/O device hard reset control (Step S407 of FIG. 5) by the multi-root I/O manager 104 illustrated in FIGS. 5, 6, and 8 is replaced by the control illustrated in FIG. 20.

In other words, as illustrated in FIG. 20, the multi-root I/O manager 104, upon reception of a request for hard reset of a multi-root I/O device 102 from a BMC 133 or the like, starts the hard reset control of the multi-root I/O device 102 (Step S1901).

Then, the multi-root I/O manager 104 determines whether the restraint of the hard reset of the multi-root I/O device 102 is canceled for the computer 100 which has requested the hard reset (Step S1902). When the restraint of the hard reset is cancelled, and the hard reset is possible, the hard reset control of the multi-root I/O device 102 is carried out (Step S1903), and, upon completion of the hard reset of the multi-root I/O device 102, the hard reset control is completed (Step S1904).

On the other hand, when it is determined in Step S1902 that the hard reset is restrained, and thus the hard reset is impossible, in place of the hard reset of the I/O device, the multi-root I/O device 102 is reset without influencing other computers 100 sharing the multi-root I/O device 102 (Step S1905).

The reset of the multi-root I/O device 102 without influencing other computers 100 sharing the multi-root I/O device 102 includes, for example, a reset at a level of a PCI Function. In other words, by resetting each of the Functions 120 of the multi-root I/O device 102, influence on the failure recovery process by the other computers 100 sharing the multi-root I/O device 102 may be prevented.

According to the fourth embodiment, it is possible to carry out, without stopping, a failure handling of an I/O device by a computer 100 which is lower in the priority indicated by the priority information K1601 than those of other computers 100 for the failure handling of a multi-root I/O device 102.

Fifth Embodiment

A description is given of a configuration of a compound computer system according to a fifth embodiment of this invention. The compound computer system according to the fifth embodiment is the same as the compound computer system according to the first embodiment of this invention illustrated in FIG. 1 except for the configuration of the resource management software 132 illustrated in FIG. 1, information in the server profile of the computer illustrated in FIG. 10, and the configuration method of the computer in the compound computer system illustrated in FIG. 11. Thus, a description is given below of only the portions different from these according to the first embodiment, and a description will not given of the same portions.

Figure 21:
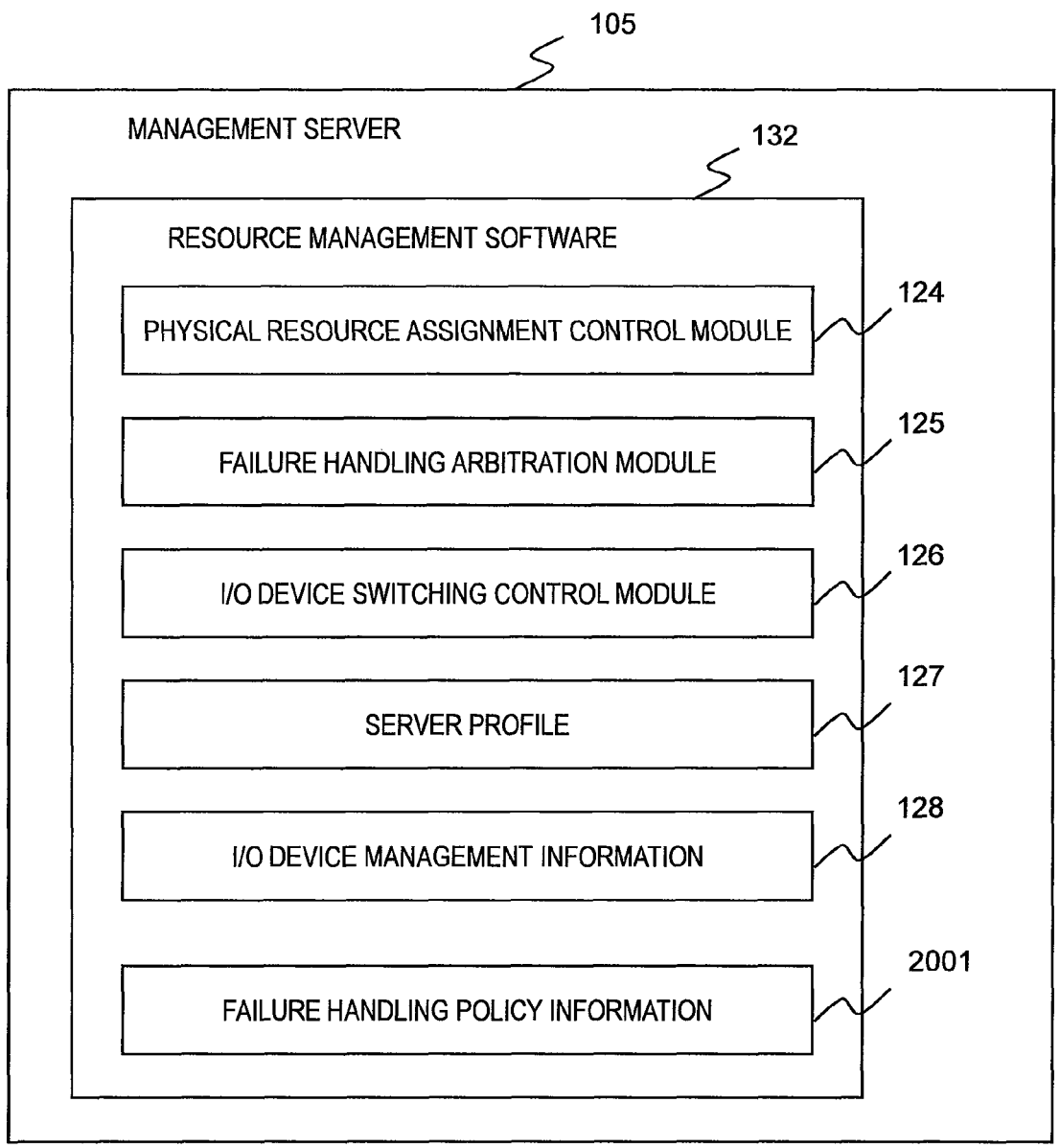
FIG. 21 is a configuration diagram of the management server 105 of the compound computer system according to the fifth embodiment.
Figure 24:
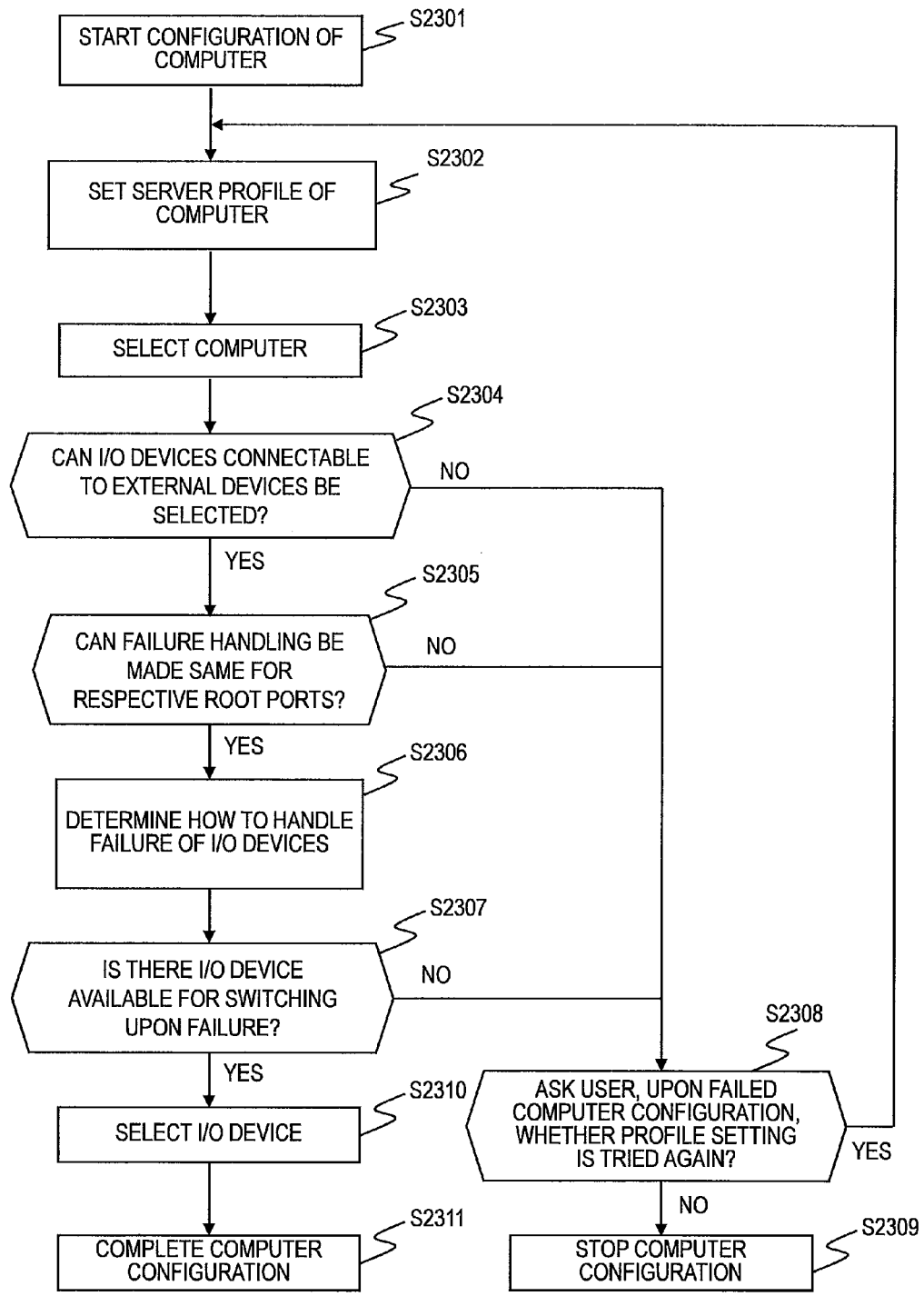
FIG. 24 is a flowchart illustrating an example of the configuration method of a computer 100 in the compound computer system according to the fifth embodiment.

FIG. 21 is a configuration diagram of the management server 105 of the compound computer system according to the fifth embodiment, and FIG. 22 illustrates an example of failure handling policy information on I/O devices of the compound computer system according to the fifth embodiment. FIG. 23 illustrates an example of the server profile 127 of the compound computer system according to the fifth embodiment. FIG. 24 is a flowchart illustrating an example of the configuration method of a computer 100 in the compound computer system according to the fifth embodiment.

As illustrated in FIG. 21, according to the fifth embodiment, to the resource management software 132 according to the first embodiment illustrated in FIG. 1, failure handling policy information 2001 on I/O devices is added. As illustrated in FIG. 22, the failure handling policy information 2001 on I/O devices represented in a tabular form FT21 includes support conditions K2101, K2102, and K2103 of the failure handling methods by the OS 111, the BIOS 112, and the multi-root I/O device 102, which are set thereto, and failure handling methods K2104 and K2105 selected for respective policy levels of the support conditions K2101, K2102, and K2103.

For example, when as support conditions of failure handling methods, the OS 111 supports the I/O retry process, and supports the I/O close process (K2101), the BIOS 112 supports the I/O retry process, and supports the I/O close process (K2102), and the multi-root I/O device 102 does not support the I/O retry process, and does not support the I/O close process (K2103), for the policy level of "LOW", the OS reboot process (K2104) is selected.

While, according to the first embodiment, a failure handling method of an I/O device at an occurrence of a failure in a multi-root I/O device 102 is specified for each of the multi-root I/O devices 102 at the management terminal 106 operated by the administrator of the computers 100, according to the fifth embodiment, only the policy level is specified by the administrator of the computers 100 at the management terminal 106, and the failure handling method for each I/O device is automatically determined by the resource management software 132 based on the policy level and the failure handling policy information 2001 on I/O devices. Thus, as illustrated in FIG. 23, the server profile 127 according to the fifth embodiment is information obtained by removing the column for the I/O device failure handling method K903 of an multi-root I/O device 102 from the server profile 127 according to the first embodiment illustrated in FIG. 10, and adding a policy level 2201 for the failure handling of I/O devices.

A description is given of a control method of the compound compute system when a computer is configured to newly configure a server at the management terminal 106 operated by the administrator who is a user of the computers 100 according to the fifth embodiment.

As illustrated in FIG. 24, in response to a request from the management terminal 106 operated by the administrator of the computers 100, a configuration process of a computer 100 is started (Step S2301). The administrator of the computers 100, at the management terminal 106, requests the resource management software 132 to provide required specifications of the computer 100 by means of the server profile 127 of the computer 100 (Step S2302). As described above, the server profile 127 is specification information on a computer 100, and contains specification information on the CPU 134, the memory 135, the multi-root I/O device 102, the OS 111, and the like.

According to the fifth embodiment, information on the multi-root I/O devices 102 particularly related to this embodiment of the server profile 127 contains information represented in a tabular form FT 22 of FIG. 23 and the policy level 2201 of the failure handling method upon an I/O device failure. It should be noted that the policy level 2201 is a value received from the management terminal 106 or the like, and takes a value "HIGH" or "LOW", for example.

Then, the physical resource assignment control module 124 selects a computer 100 which meets the specification of the server profile 127 from among computers 100 which are included in the compound computer system and are not used by users (Step S2303).

Then, the physical resource assignment control module 124 determines whether multi-root I/O devices 102 which are not used by users in the compound computer system may be connected to a specific external device K905 such as a network switch or a storage system specified in the server profile 127 (Step S2304).

Then, the physical resource assignment control module 124 determines whether, among the multi-root I/O devices 102 which meet the condition in Step S2304, the failure handling methods K904 of the multi-root I/O devices 102 may be made the same for the each root port 114 of the computer 100 (Step S2305).

Then, the physical resource assignment control module 124 determines, based on the policy level 2201 of FIG. 23, the failure handling policy information 2001 of I/O devices of FIG. 21, the information on the type of the OS 111 and the type of the BIOS 112 of the computer 100 selected in Step S2303, and the information on the multi-root I/O devices 102 selected in Step S2305, a failure handling method at an occurrence of a failure in the multi-root I/O devices 102 (Step S2306).

Then, the physical resource assignment control module 124, when the I/O device switching upon failure K904 for the multi-root I/O devices 102 is "YES" in the server profile 127, namely, the I/O device switching is specified, determines whether, from among the multi-root I/O devices 102 which are not used by users in the compound computer system, an I/O device available for switching may be selected (Step S2307). This determination is the same as the determination process in Step S1009 according to the first embodiment illustrated in FIG. 11, in other words, whether the multi-root I/O device 102 supports the failure handling method of an I/O device, whether the multi-root I/O device 102 is connectable to the external device, and whether the failure handling method may be made the same for each of the root ports 114 are determined. After these determinations, the physical resource assignment control module 124 selects a multi-root I/O device 102 to be assigned to the computer 100, and sets, to the multi-root I/O manager 104, the assignment of the multi-root I/O device 102 to the computer 100 (Step S2310). Thus, the configuration of the computer 100 is completed (Step S2311).

On the other hand, when a result of the determination process is negative in Step S2304, S2305, or S2307, the resource management software 132 notifies the management terminal 106 operated by the administrator of the computers 100 of the fact that the computer 100 may not be configured to the specification requested by the server profile 127, and determines whether the server profile 127 is tried again (S2308). When the administrator of the computers 100 sets, at the management terminal 106 operated by the administrator, the server profile 127 again, the processing returns to Step S2302, and the setting of the server profile 127 is tried again. On the other hand, when at the management terminal 106 operated by the administrator of the computers 100, the setting of the server profile 127 is not tried again, the configuration of the computer 100 is stopped (Step S2309).

As mentioned above, according to the fifth embodiment, the administrator, by setting the policy level 2201 at the management terminal 106 or the like, may automate the selection of the failure handling method when the multi-root I/O device 102 fails, resulting in a decrease in labor required for the administration of the compound computer system.

Though, in the first to fifth embodiments, the case in which the one OS 111 operates on the computer 100 is described, the embodiments may be applied to a virtual computer in which a virtual machine manager operates on the computer 100, and a plurality of OSes 111 operate on the virtual machine manager. When the embodiments are applied to the virtual computer, the notification sent from the BMC 133 to the OS 111 according to the first to fifth embodiments may be changed to a notification sent from the BMC 133 to the virtual machine manager.

Though, in the first to fifth embodiments, the example in which the device control module 103, the multi-root I/O manager 104, and the resource management software 132 are executed on the different computers is described, the device control module 103, the multi-root I/O manager 104, and the resource management software 132 may be executed on the same computer.

Though the invention devised by the inventor(s) of this invention is specifically described based on the embodiments, this invention is not limited to these embodiments, and it is understood that this invention may be modified in various manners without departing from the gist thereof.

The control method in the compound computer system according to this invention may be applied to computers such as blade server devices and rack-mount server devices intended for use in IT systems such as data centers of business enterprises which need to keep business tasks running. Further, the control method may be applied to software for managing the blade server devices and rack-mount server devices.

While the present invention has been described in detail and pictorially in the accompanying drawings, the present invention is not limited to such detail but covers various obvious modifications and equivalent arrangements, which fall within the purview of the appended claims.

What is claimed is:

1. A compound computer system, comprising:
 a plurality of computers comprising:
  a processor for carrying out arithmetic processing;
  a memory for storing information; and
  a chipset connected to the processor and having a PCI interface;
 a plurality of I/O devices comprising a multi-root I/O device sharable among the plurality of computers;
 at least one PCI switch for mutually connecting the plurality of computers and the plurality of I/O devices with each other;
 a multi-root I/O manager for controlling the at least one PCI switch to manage logical connections between the plurality of computers and the plurality of I/O devices, the multi-root I/O manager comprising:
  a monitoring module for monitoring the at least one PCI switch, and making, at an occurrence of a failure in the multi-root I/O device, a notification of the failure of the multi-root I/O device; and
  an I/O-device-hard-reset restraining module for restraining, at the occurrence of the failure in the multi-root I/O device, a hardware reset of the multi-root I/O device; and
 a resource management module for managing assignment of the plurality of I/O devices to the plurality of computers, the resource management module comprising:
  I/O device management information containing, as management information on the multi-root I/O device, at least failure handling content information indicating, for each of the plurality of computers sharing the multi-root I/O device, a content of a failure handling at the occurrence of the failure in the multi-root I/O device, and failure handling availability status information indicating, for the each of the plurality of computers sharing the multi-root I/O device, whether the hardware reset of the multi-root I/O device is possible; and
  a failure handling arbitration module for receiving the notification of the occurrence of the failure in the multi-root I/O device from the multi-root I/O manager, obtaining, in response to the notification of the occurrence of the failure, progress information on the failure handling from the each of the plurality of computers sharing the multi-root I/O device, updating the failure handling availability status information, and instructing, based on the failure handling availability status information, the multi-root I/O manager to one of restrain and cancel the hardware reset of the multi-root I/O device, wherein:

the each of the plurality of computers carries out, at the occurrence of the failure in the multi-root I/O device, the failure handling specified by the failure handling content information, and requests, when the failure handling is the hardware reset of the multi-root I/O device, the multi-root I/O manager to carry out the hardware reset of the multi-root I/O device; and the I/O-device-hard-reset restraining module restrains, upon reception of an instruction to restrain the hardware reset of the multi-root I/O device from the failure handling arbitration module in response to a request for the hardware reset of the multi-root I/O device in which the failure has occurred, the request being received from the each of the plurality of computers, the hardware reset of the multi-root I/O device.

2. The compound computer system according to claim 1, wherein the failure handling arbitration module instructs the I/O-device-hard-reset restraining module to cancel, when the hardware reset is possible according to the failure handling availability status information of all the plurality of computers, the restraint of the hardware reset of the multi-root I/O device.

3. The compound computer system according to claim 1, wherein:

the I/O device management information of the resource management module contains priority information on the failure handling of the multi-root I/O device set to the failure handling availability status information of the each of the plurality of computers sharing the multi-root I/O device;

the I/O-device-hard-reset restraining module restrains the hardware reset for the each of the plurality of computers sharing the multi-root I/O device; and the failure handling arbitration module of the resource management module refers to, at the occurrence of the failure in the multi-root I/O device, the I/O device management information on the plurality of computers to which the multi-root I/O device in which the failure has occurred is assigned, and instructs the I/O-device-hard-reset restraining module to cancel, when, for the plurality of computers having a priority of the failure handling, which is specified by the I/O device management information, higher than a predetermined value, all pieces of the failure handling availability status information indicate that the hardware reset is possible, the restraint of the hardware reset of the multi-root I/O device.

4. The compound computer system according to claim 1, wherein:

the resource management module further comprises:

server profile information storing, in advance, information used for assigning the plurality of I/O devices to the plurality of computers; and a physical resource assignment control module for assigning, based on the server profile information, the plurality of I/O devices to the plurality of computers;

the server profile information contains, for each of the plurality of I/O devices to be assigned to the each of the plurality of computers, a type of the each of the plurality of I/O devices, a content of the failure handling at an occurrence of a failure in the each of the plurality of I/O devices, and a type of an operating system to be operated on the each of the plurality of computers to which the each of the plurality of I/O devices is assigned; and the physical resource assignment control module assigns, upon assignment of the each of the plurality of I/O devices to the each of the plurality of computers, when the operating system to be operated on the each of the plurality of computers may execute the content of the failure handling stored in the server profile information, when the chipset installed on the each of the plurality of computers may execute the content of the failure handling stored in the server profile information, when a BIOS installed on the each of the plurality of computers may execute the content of the failure handling stored in the server profile information, and when the each of the plurality of I/O devices to be assigned to the each of the plurality of computers may execute the content of the failure handling stored in the server profile information, the each of the plurality of I/O devices to the each of the plurality of computers.

5. The compound computer system according to claim 4, wherein the physical resource assignment control module of the resource management module assigns, when, for each root port on a PCI bus of the each of the plurality of computers to which the each of the plurality of I/O devices is to be assigned, all the plurality of I/O devices assigned to a PCI tree below the each root port may execute the content of the failure handling stored in the server profile information, the each of the plurality of I/O devices to the each of the plurality of computers.

6. The compound computer system according to claim 5, wherein the each of the plurality of computers requests again, at the occurrence of the failure in the multi-root I/O device, when the failure handling content information specified by the I/O device management information indicates the hardware reset of the multi-root I/O device, and when the I/O-device-hard-reset restraining module is restraining the hardware reset of the multi-root I/O device, after a lapse of a first predetermined period, the hardware reset of the multi-root I/O device, suspends the failure handling after a lapse of a second predetermined period, and requests, when the restraint of the hardware reset of the multi-root I/O device is cancelled before the lapse of the second predetermined period, the multi-root I/O manager to carry out the hardware reset of the multi-root I/O device.

7. The compound computer system according to claim 6, wherein:

the resource management module holds failure handling policy information indicating the operating system executed by the each of the plurality of computers, the BIOS of the each of the plurality of computers, a support condition of the failure handling of the each of the plurality of I/O devices, and a content of the failure handling according to a level of the failure handling corresponding to the support condition;

the server profile information further contains information on a type of the each of the plurality of I/O devices to be assigned to the each of the plurality of computers, a type of the operating system to be operated on the each of the plurality of computers, and information on the level of failure handling policy; and based on the server profile information, when a failure handling method executable according to a combination of the type of the operating system of the each of the plurality of computers, the BIOS installed on the each of the plurality of computers, and the each of the plurality of I/O devices intended to be assigned to the each of the plurality of computers satisfies the support condition of the failure handling corresponding to the level of the failure handling stored in the failure handling policy information, the each of the plurality of I/O devices, which is to be assigned, is assigned to the each of the plurality of computers.

8. A management method for a compound computer system comprising:
- a plurality of computers comprising:
  - a processor for carrying out arithmetic processing;
  - a memory for storing information; and
  - a chipset connected to the processor and having a PCI interface;
- a plurality of I/O devices comprising a multi-root I/O device sharable among at least two of the plurality of computers;
- a PCI switch for mutually connecting the plurality of computers and the plurality of I/O devices with each other;
- a resource management module for managing assignment of the plurality of I/O devices to the plurality of computers; and
- a multi-root I/O manager for controlling the PCI switch to logically connects the plurality of computers to the plurality of I/O devices with each other,
  - the compound computer system carrying out, at an occurrence of a failure in one of the plurality of I/O devices, recovery processing for the failure, the management method comprising:
- setting, by the resource management module, I/O device management information containing, as management information on the multi-root I/O device, at least failure handling content information indicating, for each of the plurality of computers sharing the multi-root I/O device, a content of a failure handling at an occurrence of a failure in the multi-root I/O device, and failure handling availability status information indicating, for the each of the plurality of computers sharing the multi-root I/O device, whether a hardware reset of the multi-root I/O device is possible;
- monitoring, by the multi-root I/O manager, the PCI switch, and notifying, at the occurrence of the failure in the multi-root I/O device, the resource management module of the failure of the multi-root I/O device;
- monitoring, by the multi-root I/O manager, the PCI switch, and restraining, at the occurrence of the failure in the multi-root I/O device, the hardware reset of the multi-root I/O device in which the failure has occurred;
- obtaining, upon reception of a notification of the occurrence of the failure in the multi-root I/O device from the multi-root I/O manager, by the resource management module, progress information on the failure handling from the each of the plurality of computers sharing the multi-root I/O device;
- updating, by the resource management module, the failure handling availability status information based on the obtained progress information on the failure handling;
- instructing, by the resource management module, based on the updated failure handling availability status information, the multi-root I/O manager to one of restrain and cancel the hardware reset of the multi-root I/O device;
- carrying out, by the each of the plurality of computers, at the occurrence of the failure in the multi-root I/O device, the failure handling specified by the failure handling content information, and requesting, when the failure handling is the hardware reset of the multi-root I/O device, the multi-root I/O manager to carry out the hardware reset of the multi-root I/O device; and
- receiving, by the multi-root I/O manager, a request for the hardware reset of the multi-root I/O device in which the failure has occurred from the each of the plurality of computers, and restraining, upon receiving an instruction to restrain the hardware reset of the multi-root I/O device from the resource management module, the hardware reset of the multi-root I/O device.

9. The management method for a compound computer system according to claim 8, wherein the instructing the multi-root I/O manager to the one of restrain and cancel the hardware reset of the multi-root I/O device comprises instructing, when the resource management module judges that the hardware reset is possible according to the failure handling availability status information of all the plurality of computers, the multi-root I/O manager to cancel the restraint of the hardware reset of the multi-root I/O device.

10. The management method for a compound computer system according to claim 8, wherein:
- the setting the I/O device management information comprises setting priority information on the failure handling of the multi-root I/O device to the failure handling availability status information of the each of the plurality of computers sharing the multi-root I/O device; and wherein:
- the instructing the multi-root I/O manager to the one of restrain and cancel the hardware reset of the multi-root I/O device comprises, referring to, by the resource management module, at the occurrence of the failure in the multi-root I/O device, the I/O device management information on the plurality of computers to which the multi-root I/O device in which the failure has occurred is assigned, and instructing the multi-root I/O manager to cancel, when, for the plurality of computers having a priority of the failure handling, which is specified by the I/O device management information, higher than a predetermined value, all pieces of the failure handling availability status information indicate that the hardware reset is possible, the restraint of the hardware reset of the multi-root I/O device.

11. The management method for a compound computer system according to claim 8, further comprising the steps of:
- storing, by the resource management module, information used for assigning the plurality of I/O devices to the plurality of computers in server profile information; and
- assigning, by the resource management module, based on the server profile information, the plurality of I/O devices to the plurality of computers, wherein:
- the server profile information contains, for each of the plurality of I/O devices to be assigned to the each of the plurality of computers, a type of the each of the plurality of I/O devices, a content of the failure handling at an occurrence of a failure in the each of the plurality of I/O devices, and a type of an operating system to be operated on the each of the plurality of computers to which the each of the plurality of I/O devices is assigned; and wherein:
- the assigning the plurality of I/O devices comprises assigning, to the each of the plurality of computers, the each of the plurality of I/O devices which may execute the content of the failure handling stored in the server profile information.

12. The management method for a compound computer system according to claim 11, wherein the assigning the plurality of I/O devices further comprises assigning the each of the plurality of I/O devices so that, for each root port on a PCI bus of the each of the plurality of computers, all the plurality of I/O devices assigned to a PCI tree below the each root port may execute the content of the failure handling stored in the server profile information.

13. The management method for a compound computer system according to claim 12, further comprising the steps of:
requesting again, by the each of the plurality of computers, at the occurrence of the failure in the multi-root I/O device, when the failure handling content information specified by the I/O device management information indicates the hardware reset of the multi-root I/O device, and when I/O-device-hard-reset restraining module is restraining the hardware reset of the multi-root I/O device, after a lapse of a first predetermined period, the hardware reset of the multi-root I/O device; and
suspending, by the each of the plurality of computers, the failure handling after a lapse of a second predetermined period, and requesting, when the restraint of the hardware reset of the multi-root I/O device is cancelled before the lapse of the second predetermined period, the multi-root I/O manager to carry out the hardware reset of the multi-root I/O device.

14. The management method for a compound computer system according to claim 13, further comprising the steps of:
holding, by the resource management module, failure handling policy information indicating the operating system executed by the each of the plurality of computers, a BIOS of the each of the plurality of computers, a support condition of the failure handling of the each of the plurality of I/O devices, and a content of the failure handling according to a level of the failure handling corresponding to the support condition, wherein:
the storing comprises storing, as the information used for assigning the plurality of I/O devices to the plurality of computers, in the server profile information, information containing information on a type of the each of the plurality of I/O devices to be assigned to the each of the plurality of computers, a type of the operating system to be operated on the each of the plurality of computers, and information on the level of failure handling policy; and wherein:
the assigning the plurality of I/O devices further comprises assigning, when a failure handling method executable according to a combination of the type of the operating system stored in the server profile information, the BIOS installed on the each of the plurality of computers, and the each of the plurality of I/O devices to be assigned to the each of the plurality of computers satisfies the support condition of the failure handling corresponding to the level of the failure handling stored in the failure handling policy information, the each of the plurality of I/O devices, which is to be assigned, to the each of the plurality of computers.

15. A management server for controlling a compound computer system comprising:
a plurality of computers comprising:
a processor for carrying out arithmetic processing;
a memory for storing information; and
a chipset connected to the processor and having a PCI interface;
an I/O device sharable among the plurality of computers;
a PCI switch for mutually connecting the I/O device and the plurality of computers with each other; and
an I/O manager for controlling the PCI switch,
the management server comprising a resource management module for managing association between at least two of the plurality of computers and the I/O device,
wherein the resource management module comprises:
I/O device management information containing failure handling content information indicating, for each of the plurality of computers associated with the I/O device, a content of a failure handling at an occurrence of a failure in the I/O device, and failure handling availability status information indicating, for the each of the plurality of computers sharing the I/O device, whether a hardware reset of the I/O device is possible; and
a failure handling arbitration module for obtaining, upon reception of a notification of the occurrence of the failure in the I/O device from the I/O manager, progress information on the failure handling from the each of the plurality of computers associated with the I/O device, updating the failure handling availability status information, and instructing, based on the failure handling availability status information, the I/O manager to one of restrain and cancel the hardware reset of the I/O device.

\* \* \* \* \*